(12) United States Patent
Xiao et al.

(10) Patent No.: US 12,041,598 B2
(45) Date of Patent: Jul. 16, 2024

(54) COMMUNICATION METHOD AND APPARATUS

(71) Applicant: HUAWEI TECHNOLOGIES CO., LTD., Guangdong (CN)

(72) Inventors: Jiehua Xiao, Shenzhen (CN); Xinxian Li, Shanghai (CN); Hao Tang, Ottawa (CA); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 17/532,798

(22) Filed: Nov. 22, 2021

(65) Prior Publication Data

US 2022/0086853 A1 Mar. 17, 2022

Related U.S. Application Data

(63) Continuation of application No. PCT/CN2020/094750, filed on Jun. 5, 2020.

(30) Foreign Application Priority Data

Jun. 6, 2019 (CN) .......................... 201910491679.1

(51) Int. Cl.
*H04W 72/04* (2023.01)
*H04L 1/1812* (2023.01)
*H04W 72/12* (2023.01)

(52) U.S. Cl.
CPC .......... *H04W 72/12* (2013.01); *H04L 1/1812* (2013.01)

(58) Field of Classification Search
CPC ..... H04W 72/20; H04W 74/02; H04W 72/04; H04W 72/232
See application file for complete search history.

(56) References Cited

U.S. PATENT DOCUMENTS

| 2011/0205996 | A1 | 8/2011 | Kim et al. |
| 2014/0362755 | A1 | 12/2014 | Yu et al. |
| 2018/0279262 | A1* | 9/2018 | Babaei .................. H04L 1/1848 |

(Continued)

FOREIGN PATENT DOCUMENTS

| CN | 101350708 A | 1/2009 |
| CN | 102098152 A | 6/2011 |

(Continued)

OTHER PUBLICATIONS

3GPP TS 38.212 V15.5.0 (Mar. 2019), "3rd Generation Partnership Project; Technical Specification Group Radio Access Network; NR; Multiplexing and channel coding(Release 15)," Mar. 2019, 101 pages.

(Continued)

*Primary Examiner* — Tu X Nguyen
(74) *Attorney, Agent, or Firm* — Fish & Richardson P.C.

(57) ABSTRACT

A communication method and an apparatus are provided. An example method includes: receiving initially transmitted first data in a first cell based on a correspondence between the first cell and a first hybrid automatic repeat request (HARQ) entity; receiving first indication information, wherein the first indication information indicates a correspondence between a second cell and the first HARQ entity; and receiving retransmitted first data in the second cell based on the correspondence between the second cell and the first HARQ entity.

20 Claims, 15 Drawing Sheets

(56) References Cited

U.S. PATENT DOCUMENTS

| | | | |
|---|---|---|---|
| 2019/0132862 A1* | 5/2019 | Jeon | ................ H04L 5/0098 |
| 2019/0149305 A1 | 5/2019 | Zhou et al. | |
| 2019/0159261 A1 | 5/2019 | Jung et al. | |
| 2020/0228287 A1 | 7/2020 | Lou et al. | |

FOREIGN PATENT DOCUMENTS

| | | |
|---|---|---|
| CN | 105589506 A | 5/2016 |
| CN | 105634687 A | 6/2016 |
| CN | 105871518 A | 8/2016 |
| CN | 106992846 A | 7/2017 |
| CN | 108207032 A | 6/2018 |
| CN | 108512632 A | 9/2018 |
| CN | 108633070 A | 10/2018 |
| CN | 109391379 A | 2/2019 |
| CN | 109586866 A | 4/2019 |
| TW | 201921869 A | 6/2019 |
| WO | 2016116030 A1 | 7/2016 |
| WO | 2019062837 A1 | 4/2019 |
| WO | 2019066587 A1 | 4/2019 |

OTHER PUBLICATIONS

CMCC, NR MAC for URLLC, 3GPP TSG-RAN WG2 Meeting #97, R2-1701920, Athens, Greece, Feb. 13-17, 2017, 2 pages.

Ericsson, "MAC Impact with Multiple Active BWPs," 3GPP TSG-RAN WG2 #104, R2-1817970, Spokane, WA, USA, Nov. 12-16, 2018, 4 pages.

Huawei, HiSilicon, "Discussion on HARQ in NR," 3GPP TSG-RAN WG2 Meeting #100, R2-1713175, Reno, Nevada, USA, Nov. 27-Dec. 1, 2017, 5 pages.

Office Action issued in Chinese Application No. 201910491679.1 on May 18, 2021, 22 pages (with English translation).

Office Action issued in Chinese Application No. 201910491679.1 on Oct. 18, 2021, 10 pages.

Panasonic, "Remaining Issues on Bandwidth Part Operation," 3GPP TSG-RAN WG1 Meeting 91, R1-1720505, Reno, USA, Nov. 27-Dec. 1, 2017, 3 pages.

PCT International Search Report and Written Opinion issued in International Application No. PCT/CN2020/094750 on Sep. 10, 2020, 15 pages (with English translation).

Office Action issued in Chinese Application No. 201910491679.1 on Jun. 21, 2022, 7 pages (with English translation).

Huawei et al., "On cross-BWPs and cross-numerology retransmission," 3GPPTSG RAN WGI Meeting NR#3, R1-1715572, Nagoya, Japan, Sep. 18-21, 2017, 2 pages.

LG Electronics Inc., "BWP selection based on HARQ process ID in NR-U," 3GPP TSG-RAN WG2 Meeting #104, R2-1818220, Spokane, USA, Nov. 12-16, 2018, 2 pages.

Extended European Search Report in European Appln No. 20818653.6, dated Apr. 20, 2023, 14 pages.

* cited by examiner

COMMUNICATION METHOD AND APPARATUS

CROSS-REFERENCE TO RELATED APPLICATIONS

This application is a continuation of International Application No. PCT/CN2020/094750, filed on Jun. 5, 2020, which claims priority to Chinese Patent Application No. 201910491679.1, filed on Jun. 6, 2019. The disclosures of the aforementioned applications are hereby incorporated by reference in their entireties.

TECHNICAL FIELD

This application relates to the field of communication technologies, and in particular, to a communication method and an apparatus.

BACKGROUND

In a wireless communication system, data transmission is performed based on a hybrid automatic repeat request (HARQ) mechanism. The HARQ mechanism is a technology that combines a forward error correction (FEC) method and an automatic repeat request (ARQ) method. The HARQ mechanism is used to perform initial transmission and retransmission of data, to improve system reliability and system transmission efficiency. How to perform initial transmission and retransmission of data based on the HARQ mechanism is a hot research topic at present.

SUMMARY

This application provides a communication method and an apparatus, to implement initial transmission and retransmission of data by using different cells.

According to a first aspect, a communication method is provided. The method includes: receiving initially transmitted first data in a first cell based on a correspondence between the first cell and a first hybrid automatic repeat request (HARQ) entity; receiving first indication information, where the first indication information is used to indicate a correspondence between a second cell and the first HARQ entity; and receiving retransmitted first data in the second cell based on the correspondence between the second cell and the first HARQ entity.

In this embodiment of this application, the correspondence between the first HARQ entity and the second cell is indicated by using the first indication information, so that the first data corresponding to the first HARQ entity is retransmitted by using the second cell. Compared with a manner of retransmitting the first data after the first cell recovers to normal, a throughput of data can be improved.

In a possible design, the second cell includes a first bandwidth part (BWP), and the correspondence between the second cell and the first HARQ entity includes a correspondence between the first BWP and the first HARQ entity.

In a possible design, the first indication information is an identifier of the first BWP, and the method further includes: determining the correspondence between the first BWP and the first HARQ entity based on the identifier of the first BWP.

In a possible design, the method further includes: sending second indication information, where the second indication information is used to indicate a link interruption of the first cell or a beam mismatch of the first cell.

In a possible design, the first data includes a first data block, and the method further includes: receiving first downlink control information (DCI), where the first DCI is used to schedule retransmission of the first data block; and the receiving retransmitted first data in the second cell based on the correspondence between the second cell and the first HARQ entity includes: receiving the retransmitted first data block in the second cell based on the correspondence between the second cell and the first HARQ entity.

In a possible design, the first data includes a second data block, and the method further includes: receiving second DCI, where the second DCI is used to schedule retransmission of the second data block; and the receiving retransmitted first data based on the correspondence between the second cell and the first HARQ entity includes: receiving the retransmitted second data block in the second cell based on the correspondence between the second cell and the first HARQ entity.

It can be learned from the foregoing that, in this embodiment of this application, the first data includes the first data block and the second data block, and both the first data block and the second data block are retransmitted in the second cell, so that utilization of the second cell is improved.

In a possible design, the method further includes: receiving the retransmitted first data in a third cell based on a correspondence between the third cell and the first HARQ entity.

In a possible design, the first data includes a second data block, and the method further includes: receiving third DCI, where the third DCI is used to schedule retransmission of the second data block; and the receiving the retransmitted first data in a third cell based on a correspondence between the third cell and the first HARQ entity includes: receiving the retransmitted second data block in the third cell based on the correspondence between the third cell and the first HARQ entity.

It can be learned from the foregoing that, in this embodiment of this application, the first data includes the first data block and a third data block, the first data block is retransmitted in the second cell, and the second data block is retransmitted in the third cell, so that data transmission efficiency can be improved.

In a possible design, the first DCI is further used to indicate at least one of an index of the first data block, a start identifier, or an end identifier, and the second DCI or the third DCI is further used to indicate at least one of an index of the second data block, a start identifier, or an end identifier, where the start identifier indicates the first retransmitted data block in the retransmitted first data, and the end identifier indicates the last retransmitted data block in the retransmitted first data.

In a possible design, the method further includes: sending fourth DCI, where the fourth DCI is used to schedule retransmission of second data and third data, and the second data and the third data are initially transmitted in the second cell; and retransmitting the second data and the third data in the first cell, or retransmitting the second data and the third data in a fourth cell.

In this embodiment of this application, an application scenario is provided. In the application scenario, a transmission bandwidth of the first cell or the fourth cell is larger than a transmission bandwidth of the second cell. The second data and the third data are initially transmitted in the second cell. After the first cell recovers from an abnormality, the second data and the third data may be retransmitted in the first cell. Alternatively, the second data and the third data are retransmitted in the fourth cell, to improve data transmission efficiency.

According to a second aspect, a communication method is provided. The method includes: initially transmitting first data in a first cell based on a correspondence between the first cell and a first hybrid automatic repeat request (HARQ) entity; sending first indication information, where the first indication information is used to indicate a correspondence between a second cell and the first HARQ entity; and retransmitting the first data in the second cell based on the correspondence between the second cell and the first HARQ entity.

In a possible design, the second cell includes a first bandwidth part (BWP), and the correspondence between the second cell and the first HARQ entity includes a correspondence between the first BWP and the first HARQ entity.

In a possible design, the first indication information is an identifier of the first BWP.

In a possible design, the method further includes: receiving second indication information, where the second indication information is used to indicate a link interruption of the first cell or a beam mismatch of the first cell.

In a possible design, the first data includes a first data block, and the method further includes: sending first downlink control information DCI, where the first DCI is used to schedule retransmission of the first data block; and the retransmitting the first data in the second cell based on the correspondence between the second cell and the first HARQ entity includes: retransmitting the first data block in the second cell based on the correspondence between the second cell and the first HARQ entity.

In a possible design, the first data includes a second data block, and the method further includes: sending second DCI, where the second DCI is used to schedule retransmission of the second data block; and the retransmitting the first data in the second cell based on the correspondence between the second cell and the first HARQ entity includes: retransmitting the second data block in the second cell based on the correspondence between the second cell and the first HARQ entity.

In a possible design, the method further includes: retransmitting the first data in a third cell based on a correspondence between the third cell and the first HARQ entity.

In a possible design, the first data includes a second data block, and the method further includes: sending third DCI, where the third DCI is used to schedule retransmission of the second data block; and the retransmitting the first data in a third cell based on a correspondence between the third cell and the first HARQ entity includes: retransmitting the second data block in the third cell based on the correspondence between the third cell and the first HARQ entity.

In a possible design, the first DCI is further used to indicate at least one of an index of the first data block, a start identifier, or an end identifier, and the second DCI or the third DCI is further used to indicate at least one of an index of the second data block, a start identifier, or an end identifier, where the start identifier indicates the first retransmitted data block in the retransmitted first data, and the end identifier indicates the last retransmitted data block in the retransmitted first data.

In a possible design, the method further includes: sending fourth DCI, where the fourth DCI is used to schedule retransmission of second data and third data, and the second data and the third data are initially transmitted in the second cell; and retransmitting the second data and the third data in the first cell, or retransmitting the second data and the third data in a fourth cell.

According to a third aspect, a communication apparatus is provided. The apparatus may be a terminal device, or may be an apparatus in the terminal device, or an apparatus that can be used in coordination with the terminal device. The apparatus may include a transceiver module and a processing module, and the transceiver module and the processing module may perform corresponding functions in any possible design example of the first aspect. Specifically:

The processing module is configured to: receive initially transmitted first data in a first cell based on a correspondence between the first cell and a first hybrid automatic repeat request (HARQ) entity; and receive retransmitted first data in a second cell based on a correspondence between the second cell and the first HARQ entity.

The transceiver module is configured to receive first indication information, where the first indication information is used to indicate a correspondence between a second cell and the first HARQ entity.

For specific functions of the transceiver module and the processing module, refer to descriptions in embodiments of the first aspect. Details are not described herein again.

According to a fourth aspect, a communication apparatus is provided. The apparatus includes a processor, configured to implement the method described in the first aspect. The apparatus may further include a memory, configured to store instructions and data. The memory is coupled to the processor. When executing program instructions stored in the memory, the processor can implement the method described in the first aspect. The apparatus may further include a communication interface. The communication interface is used by the apparatus to communicate with another device. For example, the communication interface may be a transceiver, a circuit, a bus, a module, or a communication interface of another type. The another device may be a network device or the like. In a possible design, the apparatus includes:

a memory, configured to store program instructions;

a processor, configured to: receive initially transmitted first data in a first cell based on a correspondence between the first cell and a first hybrid automatic repeat request (HARQ) entity; and receive retransmitted first data in a second cell based on a correspondence between the second cell and the first HARQ entity; and a communication interface, configured to receive first indication information, where the first indication information is used to indicate the correspondence between the second cell and the first HARQ entity.

For specific functions of the communication interface and the processor, refer to descriptions in embodiments of the first aspect. Details are not described herein again.

According to a fifth aspect, a communication apparatus is provided. The apparatus may be a network device, or may be an apparatus in the network device, or an apparatus that can be used in coordination with a terminal device. The apparatus may include a transceiver module, and the transceiver module may perform a corresponding function in any possible design example of the second aspect. Specifically:

The processing module is configured to: initially transmit first data in a first cell based on a correspondence between the first cell and a first hybrid automatic repeat request (HARQ) entity; and retransmit the first data in a second cell based on a correspondence between the second cell and the first HARQ entity.

The transceiver module is configured to send first indication information, where the first indication information is used to indicate the correspondence between the second cell and the first HARQ entity.

For specific functions of the transceiver module and the processing module, refer to the descriptions in the second aspect. Details are not described herein again.

According to a sixth aspect, a communication apparatus is provided. The apparatus includes a communication interface, configured to implement the method described in the second aspect. The communication interface is used by the apparatus to communicate with another device. For example, the communication interface may be a transceiver, a circuit, a bus, a module, or a communication interface of another type. The another device may be a terminal device or the like. The apparatus further includes a processor. When program instructions stored in a memory are executed, the processor is configured to control the communication interface to implement the method described in the first aspect. The apparatus may further include the memory. The memory is configured to store instructions and data. In a possible design, the apparatus includes:

a memory, configured to store program instructions;

a processor, configured to: initially transmit first data in a first cell based on a correspondence between the first cell and a first hybrid automatic repeat request (HARQ) entity; and retransmit the first data in a second cell based on a correspondence between the second cell and the first HARQ entity; and a communication interface, configured to send first indication information, where the first indication information is used to indicate the correspondence between the second cell and the first HARQ entity.

For specific functions of the communication interface and the processor, refer to the descriptions in the second aspect. Details are not described herein again.

According to a seventh aspect, an embodiment of this application further provides a computer-readable storage medium, including instructions. When the instructions are run on a computer, the computer is enabled to perform the method according to any possible design in the first aspect or the second aspect.

According to an eighth aspect, an embodiment of this application further provides a chip system. The chip system includes a processor, may further include a memory, and is configured to implement the method in the first aspect or the second aspect. The chip system may include a chip, or may include a chip and another discrete component.

According to a ninth aspect, an embodiment of this application further provides a computer program product, including instructions. When the instructions are run on a computer, the computer is enabled to perform the method in the first aspect or the second aspect.

According to a tenth aspect, an embodiment of this application provides a system, where the system includes the apparatus according to the third aspect and the apparatus according to the fifth aspect, or the system includes the apparatus according to the fourth aspect and the apparatus according to the sixth aspect.

DESCRIPTION OF EMBODIMENTS

Figure 1:
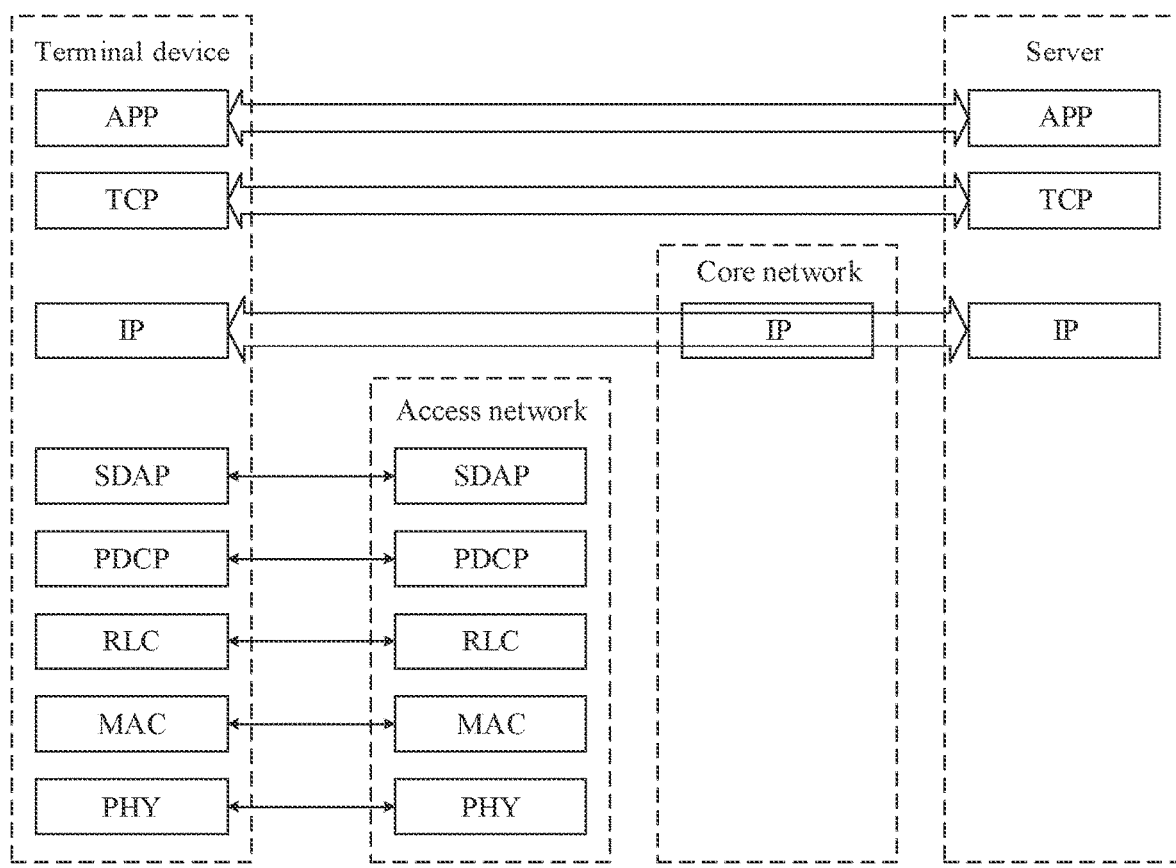
FIG. 1 is a schematic diagram of a protocol stack architecture of data transmission according to an embodiment of this application.

For ease of understanding, descriptions of concepts related to this application are provided as an example for reference. It may be understood that the descriptions of related concepts are also used as part of the content in the embodiments of this application, and are specifically as follows:

1. Network Device

The network device may be an access network device. The access network device may also be referred to as a radio access network (RAN) device, and is a device that provides a wireless communication function for a terminal device. For example, the access network device includes but is not limited to: a next-generation base station (generation NodeB, gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmitting point (TP), a mobile switching center, and the like. Alternatively, the access network device may be a radio controller, a centralized unit (CU), and/or a distributed unit (DU) in a cloud radio access network (CRAN) scenario, or the network device may be a relay station, an access point, a vehicle-mounted device, a terminal device, a wearable device, a network device in a future 5G network, a network device in a future evolved PLMN network, or the like. The terminal device may communicate with a plurality of access network devices by using different technologies. For example, the terminal device may communicate with an access network device supporting long term evolution (LTE), may communicate with an access network device supporting 5G, or may implement dual connectivity with an access network device supporting LTE and an access network device supporting 5G. This is not limited in the embodiments of this application.

In the embodiments of this application, an apparatus configured to implement a network device function may be a network device, or may be an apparatus, for example, a chip system, that can support the network device in implementing the function. The apparatus may be installed in the network device. In the technical solutions provided in the embodiments of this application, the technical solutions provided in the embodiments of this application are described by using an example in which the apparatus for implementing the function of the network device is a network device and the network device is a base station.

2. Terminal Device

The terminal device may be referred to as a terminal for short, and is a device having a wireless transceiver function. The terminal device may be deployed on land, including an indoor device, an outdoor device, a handheld device, or a vehicle-mounted device; or may be deployed on water (for example, on a ship); or may be deployed in the air (for example, on a plane, a balloon, or a satellite). The terminal device may be a mobile phone, a tablet computer (pad), a computer having a wireless transceiver function, a virtual reality (VR) terminal device, an augmented reality (AR) terminal device, a wireless terminal device in industrial control, a wireless terminal device in self-driving, a wireless terminal device in telemedicine, a wireless terminal device in a smart grid, a wireless terminal device in transportation safety, a wireless terminal device in a smart city, or a wireless terminal device in a smart home, and may further include user equipment (UE) and the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5th generation (5G) network, a terminal device in a future evolved public land mobile network (PLMN), or the like. The terminal device sometimes may also be referred to as user equipment (UE), an access terminal device, a vehicle-mounted terminal device, an industrial control terminal device, a UE unit, a UE station, a mobile station, a mobile console, a remote station, a remote terminal device, a mobile device, a UE terminal device, a wireless communication device, a UE agent, a UE apparatus, or the like. The terminal device may be fixed or movable. This is not limited in the embodiments of this application.

In the embodiments of this application, an apparatus configured to implement a terminal function may be a terminal, or may be an apparatus, for example, a chip system, that can support the terminal in implementing the function. The apparatus may be installed in the terminal. In this embodiment of this application, the chip system may include a chip, or may include a chip and another discrete component. The technical solutions provided in the embodiments of this application are described by using an example in which the apparatus for implementing the function of the terminal is a terminal and the terminal is a UE.

3. Carrier Aggregation (CA)

The carrier aggregation is a technology in which at least two component carriers (CCs) are aggregated to support a larger transmission bandwidth. To efficiently use fragmented spectrums, the carrier aggregation supports aggregation of different component carriers, for example, aggregation of component carriers in same or different bandwidths, aggregation of adjacent or non-adjacent component carriers in a same frequency band, or aggregation of component carriers in different frequency bands.

4. Protocol Stack of Data Transmission

As shown in FIG. 1, in a protocol stack used for user plane data transmission, a terminal device side (for example, UE) sequentially includes, from upper to lower, an application protocol (APP) layer, a transmission control protocol (TCP) layer, an internet protocol (IP) layer, a service data adaptation protocol (SDAP) layer, a packet data convergence protocol (PDCP) layer, a radio link control (RLC) layer, a medium access control (MAC) layer, a physical (PHY) layer, and the like. An access network side (for example, a gNB) sequentially includes, from upper to lower, an SDAP layer, a PDCP layer, an RLC layer, a MAC layer, a PHY layer, and the like. A core network side (for example, a core) may include an IP layer and the like. A server side (for example, a server) sequentially includes, from upper to lower, an APP layer, a TCP layer, an IP layer, and the like.

An example in which the terminal device downloads data from the server is used. A black arrow shown in FIG. 1 indicates a main flow direction of data in each protocol stack in a data download process. It should be noted that, on the access network side, the SDAP layer to the PHY layer are air interface protocol stacks on a RAN side. This is not a limitation on this application. For example, in some examples, the access network side may further include a protocol stack of another wired transmission part.

5. Hybrid Automatic Repeat Request (HARQ)

HARQ retransmission is a data retransmission mechanism at the MAC layer, and is a technology that combines a forward error correction (FEC) method and an automatic repeat request (ARQ) method.

For example, after receiving a data packet sent by a transmit end, a receive end may use an error detection code to detect whether an error occurs in the received data packet. For example, the error detection code may be a cyclic redundancy check (CRC) code or the like. If the data packet has no error, the receive end sends an acknowledgment (ACK) to the transmit end. If the data packet has an error, the receive end first corrects the error by using the forward error correction (FEC). If the FEC can be used to correct the error, the receive end may send an ACK to the transmit end. If the FEC cannot be used to correct the error, the receive end may send a negative acknowledgment (NACK) to the transmit end.

For a case in which the receive end sends the NACK, that is, for a data packet with an error that cannot be corrected by using the FEC, the receive end may discard the data packet with the error, or the receive end may save the data packet with the error, so that after data is retransmitted, the data packet with the error may be combined with the retransmitted data. For example, the ACK may be represented by using "1", and the NACK may be represented by using "0". By using the HARQ mechanism, system reliability and system transmission efficiency of the transmit end and the receive end can be improved.

6. Automatic Repeat Request (ARQ)

ARQ retransmission is a data retransmission mechanism at the RLC layer. Retransmitted data is an RLC service data unit (SDU), or retransmitted data is a segment of the RLC SDU. The transmit end may trigger the ARQ retransmission at the RLC layer based on the NACK sent by the receive end. Alternatively, when an RLC transmit timer of the transmit end expires, the ARQ retransmission at the RLC layer is triggered.

A major difference between the HARQ and the ARQ lies in that: In the ARQ technology, if the receive end learns that a data packet is incorrectly transmitted, the receive end discards the original data packet and applies for data packet retransmission. However, in the HARQ technology, if the receive end learns that a data packet is incorrectly transmitted, the receive end retains the original data packet that is incorrectly transmitted and applies for data packet retransmission. Finally, the receive end combines a retransmitted data packet with the original data packet, to obtain a diversity gain. The diversity gain may also be referred to as a soft combining gain. In addition, with reference to an encoding manner, different encoding redundant bits may be retained in different times of retransmission, to obtain the diversity gain.

It can be learned from the foregoing description that the ARQ mechanism uses a method of discarding the data packet and requesting retransmission, while the HARQ mechanism uses a method of combining the original data packet with the retransmitted data packet to obtain the diversity gain. It may be understood that, for a data packet that is incorrectly transmitted, although the initial original data packet cannot be correctly decoded, useful information is still included in the packet. If the data packet is discarded, correspondingly, the useful information is lost.

In the embodiments of this application, a HARQ with soft combining mechanism may be used for the HARQ mechanism. A soft combining process may be as follows: After the receive end receives a data packet with an error, the data packet with the error may be stored in a HARQ buffer, and combined with a retransmitted data packet that is subsequently received, to obtain a data packet that is more reliable than a data packet obtained through decoding alone. Then a combined data packet is decoded. If decoding still fails, a process of "requesting retransmission, and then performing soft combining" is repeated.

In this embodiment of this application, the HARQ with soft combining may include chase combining and incremental redundancy, depending on whether retransmitted bit information is the same as originally transmitted bit information. In the chase combining, bit information of a retransmitted data packet is the same as that of an original data packet; in the incremental redundancy, bit information of a retransmitted data packet may be different from that of an original data packet.

For example, in the incremental redundancy, the transmit end may generate a plurality of coded bit sets, and each coded bit set may carry same information, that is, coded input information is the same. When the transmit end needs to perform data retransmission, the transmit end may select a coded bit set different from a previous one. Correspondingly, the receive end may combine retransmitted data with previously transmitted data. A coded bit set in each retransmission may be referred to as a redundancy version (RV).

7. HARQ Entity

Figure 2:
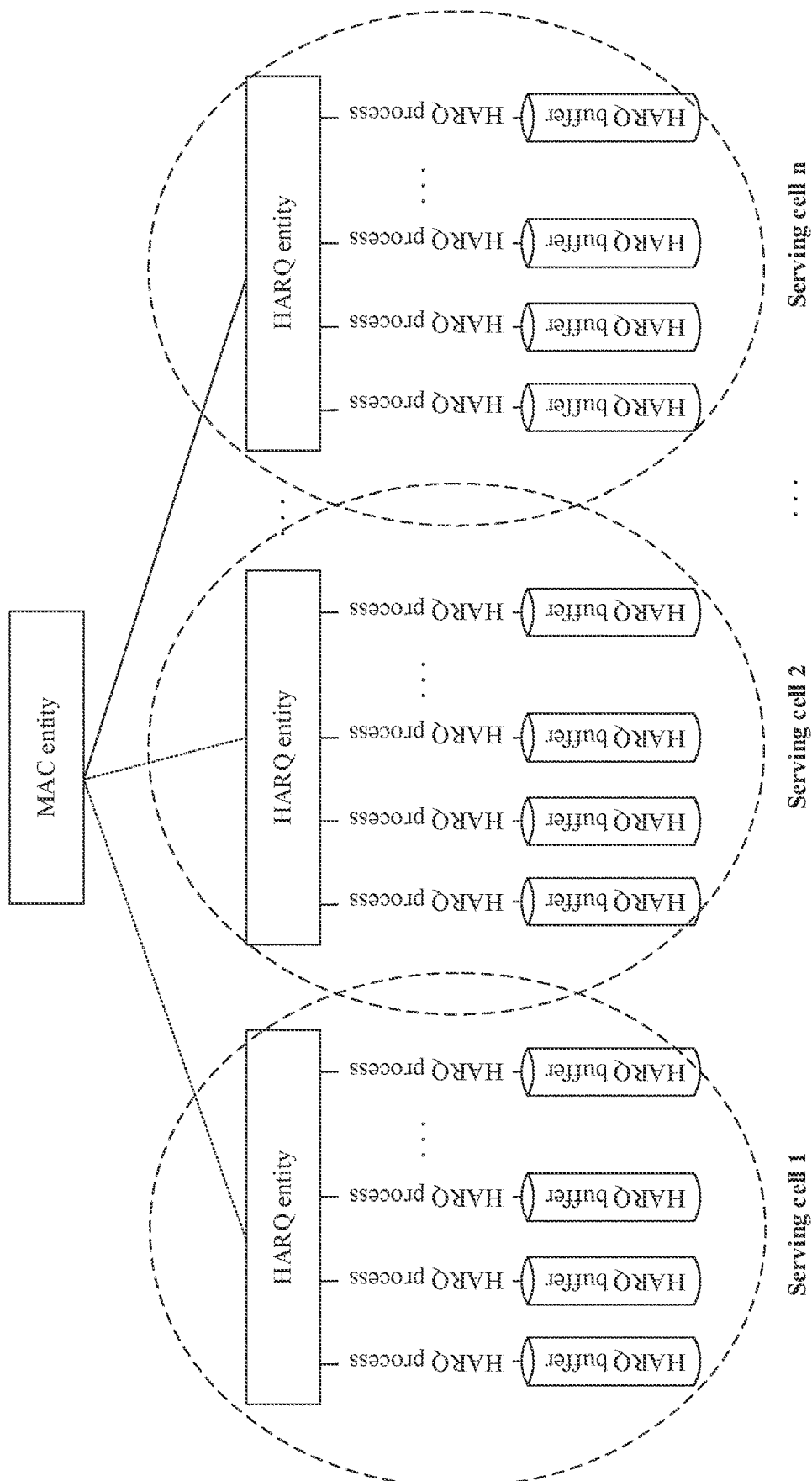
FIG. 2 is a schematic diagram of a relationship between a MAC entity, a HARQ entity, a HARQ process, and a HARQ buffer under carrier aggregation according to an embodiment of this application.

In an upper-layer protocol framework of an access network, CA is visible only to the MAC layer. For the upper-layer protocol framework of the access network, refer to descriptions of FIG. 1. Details are not described herein again. As shown in FIG. 2, when dual-connectivity (DC) is not configured for the terminal device, there is only one MAC entity at the MAC layer; when DC is configured for the terminal device, there are two MAC entities at the MAC layer. Each cell in the carrier aggregation corresponds to one HARQ entity. For example, in the example shown in FIG. 2, n serving cells may correspond to n HARQ entities in total. One HARQ entity corresponds to a group of HARQ processes, and each HARQ process corresponds to one HARQ buffer.

For the transmit end, the HARQ buffer is configured to store a sent transport block (TB), for example, a TB that does not receive a correct feedback. For the receive end, the HARQ buffer is configured to store decoding soft information of the TB and the like.

It should be noted that, in one time unit, each HARQ process can process only one TB, and one HARQ corresponds to one TB. A unit of the time unit may be a subframe, a slot, a symbol, or the like, and one time unit may include one subframe, one slot, one or more symbols, or the like. Correspondingly, at the receive end, each HARQ process has an independent HARQ buffer, to perform soft combining on received data. In space division multiplexing, two TBs are transmitted in parallel in one time unit. Each TB has its own independent HARQ acknowledgment information, and the TBs are processed by using different HARQ processes. In this case, one HARQ entity may include two HARQ process sets.

It should be noted that, in the embodiments of this application, the HARQ entity is configured to control the HARQ process, and an association between a cell and the HARQ entity may be further described as an association between the cell and the HARQ process, or the like. The MAC layer of the network device or the terminal device includes a MAC entity. The MAC entity of the network device or the terminal device is configured to process one or more of the following transmission channels: a broadcast channel (BCH), a downlink shared channel (DL-SCH), a paging channel (PCH), an uplink shared channel (UL-SCH), and a random-access channel (RACH). For uplink and downlink, the MAC entity is responsible for mapping a logical channel to the transmission channel. The logical channel is a channel that supports transmission of a specific type of information, and each logical channel is defined by a type of information transmitted on the logical channel. The logical channel includes a broadcast control channel (BCCH), a paging control channel (PCCH), a common control channel (CCCH), a dedicated control channel (DCCH), and a dedicated traffic channel (DTCH), and is used to transmit broadcast information, paging information, common control information, dedicated control information, and dedicated traffic data of the cell. The MAC entity includes the HARQ entity. The HARQ entity is configured to maintain a plurality of parallel HARQ processes. During downlink data transmission, the HARQ entity of the terminal points HARQ information received on the DL-SCH and an associated TB to a corresponding HARQ process. When spatial multiplexing is not configured for the physical layer, one HARQ process supports one TB. HARQ information used for DL-SCH or UL-SCH transmission includes a new data indicator (NDI), a transport block size (TBS), a redundancy version (RV), a HARQ process number, and the like.

8. Primary Cell (PCell)

The primary cell may be a cell in which the terminal device establishes an initial connection, the primary cell may be a cell in which the terminal device reestablishes a radio resource control (RRC) connection, or the primary cell may be a primary cell specified in a handover process. The primary cell is mainly used for RRC communication with the terminal device. A component carrier corresponding to the primary cell is referred to as a primary component carrier (PCC). A downlink carrier of the primary component carrier is referred to as a downlink primary component carrier (downlink PCC, DL PCC), and an uplink carrier of the primary component carrier is referred to as an uplink primary component carrier (uplink PCC, UL PCC).

9. Secondary Cell (SCell)

The secondary cell may be a cell that does not have RRC communication with the terminal device, and is mainly configured to provide an additional radio resource. The secondary cell may be added during RRC reconfiguration. A component carrier corresponding to the secondary cell is referred to as a secondary component carrier (SCC). A downlink carrier of the secondary component carrier is referred to as a downlink secondary component carrier (downlink SCC, DL SCC), and an uplink carrier of the secondary component carrier is referred to as an uplink secondary component carrier (uplink SCC, UL SCC).

For example, the primary cell may be determined during connection establishment, and the secondary cell may be added, modified, or released by using an RRC connection reconfiguration message after initial access is completed.

10. Serving Cell

The serving cell may be a cell that provides uplink and downlink transmission services for the terminal device. If the terminal device is in an RRC connected (RRC_CONNECTED) state but CA is not configured for the terminal device, the terminal device has only one serving cell, and the serving cell may be a primary cell; if the terminal device is in an RRC connected (RRC_CONNECTED) state and CA is configured for the terminal device, the terminal device may include a serving cell set, and the serving cell set includes a primary cell and a secondary cell. It may be understood that, in the embodiments of this application, the serving cell may refer to the primary cell, the serving cell may refer to the secondary cell, or the serving cell may refer to both the primary cell and the secondary cell.

11. Bandwidth Part (BWP)

The BWP is a group of consecutive RB resources on a carrier. It is specified in a release 15 of a new radio access technology (NR) that, for a terminal device, a maximum of four terminal-specific BWPs may be configured for one serving cell. In frequency division duplexing (FDD), four BWPs may be separately configured for uplink and downlink each, and in time division duplexing (TDD), four BWPs may be separately configured for uplink and downlink each. At any moment, only one BWP can be activated, and the terminal device and the network device send and receive data on the activated BWP. In a carrier bandwidth (carrier BW), the terminal may support only one BWP, a bandwidth of the BWP is less than or equal to a UE bandwidth capability, and the UE bandwidth capability is less than or equal to the carrier bandwidth (carrier BW). Alternatively, in the carrier bandwidth, the terminal may support two BWPs: a BWP 1 and a BWP 2, and bandwidths of the BWP 1 and the BWP 2 overlap. Alternatively, in the carrier bandwidth, the terminal may support two BWPs: a BWP 1 and a BWP 2, and bandwidths of the BWP 1 and the BWP 2 do not overlap.

12. Frequency Range 1 (FR1) and Frequency Range 2 (FR2)

As shown in Table 1, in an NR protocol, frequencies used for 5G communication are divided into FR1 and FR2 based on ranges. FR1 corresponds to a frequency range of 450 MHz to 6000 MHz, and corresponds to a low frequency band. FR2 corresponds to a frequency range of 24250 MHz to 52600 MHz, and corresponds to a high frequency band. Channel bandwidths in different FRs may be different. Because the high frequency band has abundant resources, the channel bandwidth of the high frequency band is generally large.

TABLE 1

Definition of frequency range

| Frequency range designation | Corresponding frequency range |
| --- | --- |
| FR1 | 450 MHz to 6000 MHz |
| FR2 | 24250 MHz to 52600 MHz |

As shown in Table 2, for FR1, when a subcarrier spacing SCS is 15 kHz, a maximum channel bandwidth of 50 MHz is supported, and when the SCS is 30 kHz or 60 kHz, a maximum channel bandwidth of 100 MHz is supported. As shown in Table 3, for FR2, when an SCS is 60 kHz, a maximum channel bandwidth of 200 MHz is supported, and when the SCS is 120 kHz, a maximum channel bandwidth of 400 MHz is supported.

TABLE 2

Correspondence table of N RBs configured for channel bandwidths and transmission bandwidths in different system parameters in FR1

| SCS (kHz) | 5 MHz N RBs | 10 MHz N RBs | 15 MHz N RBs | 20 MHz N RBs | 25 MHz N RBs | 30 MHz N RBs | 40 MHz N RBs | 50 MHz N RBs | 60 MHz N RBs | 70 MHz N RBs | 80 MHz N RBs | 90 MHz N RBs | 100 MHZ N RBs |
| --- | --- | --- | --- | --- | --- | --- | --- | --- | --- | --- | --- | --- | --- |
| 15 | 25 | 52 | 79 | 106 | 133 | 160 | 216 | 270 | N.A | N.A | N.A | N.A | N.A |
| 30 | 11 | 24 | 38 | 51 | 65 | 78 | 106 | 133 | 162 | 189 | 217 | 245 | 273 |
| 60 | N.A | 11 | 18 | 24 | 31 | 38 | 51 | 65 | 79 | 93 | 107 | 121 | 135 |

TABLE 3

Correspondence table of N RBs configured for channel bandwidths and transmission bandwidths in different system parameters in FR2

| SCS (kHz) | 50 MHz N RBs | 100 MHz N RBs | 200 MHz N RBs | 400 MHz N RBs |
| --- | --- | --- | --- | --- |
| 60 | 66 | 132 | 264 | N.A |
| 120 | 32 | 66 | 132 | 264 |

13. Transport Block (TB) Coding Process

In the embodiments of this application, the TB may be represented as a bit sequence, where A is a load size, namely, a quantity of bits included in the TB, and may also be referred to as a size of the TB. In the following example, the TB coding process is described in detail by using as an example in which the TB is represented by using $a_0, a_1, a_2, a_3, \ldots a_{A-1}$.

In the embodiments of this application, a low-density parity-check (LDPC) base graph is selected based on values of A and a coding rate R. A selection result of the LDPC base graph may be an LDPC base graph 1 or an LDPC base graph 2. A CRC is generated based on $a_0, a_1, a_2, a_3, \ldots, a_{A-1}$, and the generated CRC may be represented as $p_0, p_1, p_2, p_3, \ldots, p_{L-1}$. The CRC is added to the TB. A size of the TB after the CRC is added may be represented as: B=A+L, where L represents a size of the added CRC, and B represents the size of the TB after the CRC is added. Further, CB segmentation is performed on the TB, CRC is added to the segmented CB, and then channel coding, rate matching, CB concatenation, and the like are performed on the CB.

14. Code Block Group (CBG) Transmission

A CBG is a result of dividing code blocks (CBs) of the TB into groups. It is assumed that one transport block (TB) includes C code blocks (CBs). A quantity M of CBGs is jointly determined based on a configured value N of RRC and the quantity C of CBs included in one TB.

When only one codeword is transmitted in one time unit, when N is greater than or equal to C, the quantity M of the CBGs is equal to C, and when N is less than C, the quantity M of the CBGs is equal to N. Alternatively, the quantity M of the CBGs may be described by using the following formula: M=min(N, C).

N is determined based on a quantity of CBGs configured for the RRC in an existing protocol, and a value of N may be 2, 4, 6, 8, or the like. C is the quantity of the CBs included in one TB, and a value of C is determined based on the size B of the TB after the CRC is added. For example, B=A+L, A represents a size of the TB, B represents the size of the TB after the CRC is added, and L represents the size of the CRC.

The C CBs may be divided into the M CBGs based on the determined quantity M of the CBGs and a specific mapping criterion. When the transmit end sends data, the receive end may perform HARQ feedback at a granularity of the CBG, and the transmit end may perform CBG data retransmission based on HARQ feedback information at the CBG granularity.

15. Downlink Control Information (DCI) Indication of the CBG Transmission

To support data transmission at the CBG granularity, an information field of the DCI scheduled by using downlink or uplink data may include a CBGTI or a CBGFI. A quantity of bits of the CBGTI is determined based on the value of N configured for the RRC, and each bit indicates a transmission state of each CBG. For example, "1" indicates that a corresponding CBG is transmitted, and "0" indicates that the corresponding CBG is not transmitted. The CBGFI indicates whether a currently transmitted CBG can be soft combined with a previously transmitted CBG. For example, "1" indicates that the combination can be performed, and "0" indicates that the combination cannot be performed.

16. TCP Congestion Control

The TCP congestion control is a mechanism for processing network congestion through congestion windows. A mainstream TCP congestion control algorithm divides an entire TCP connection process into four stages: slow start, congestion avoidance, congestion control, and fast retransmission/recovery. In the congestion control stage, the transmit end adjusts, depending on whether feedback of a TCP data packet expires or whether the TCP data packet is lost, a data volume sent by the TCP data packet. When it is detected that the feedback of the TCP data packet expires or the data packet is lost, the data volume sent by the TCP data packet may be greatly reduced, so that a data volume sent by an upper layer to the RAN side can be reduced.

17. Beam Failure Detection and Beam Failure Recovery

Figure 3:
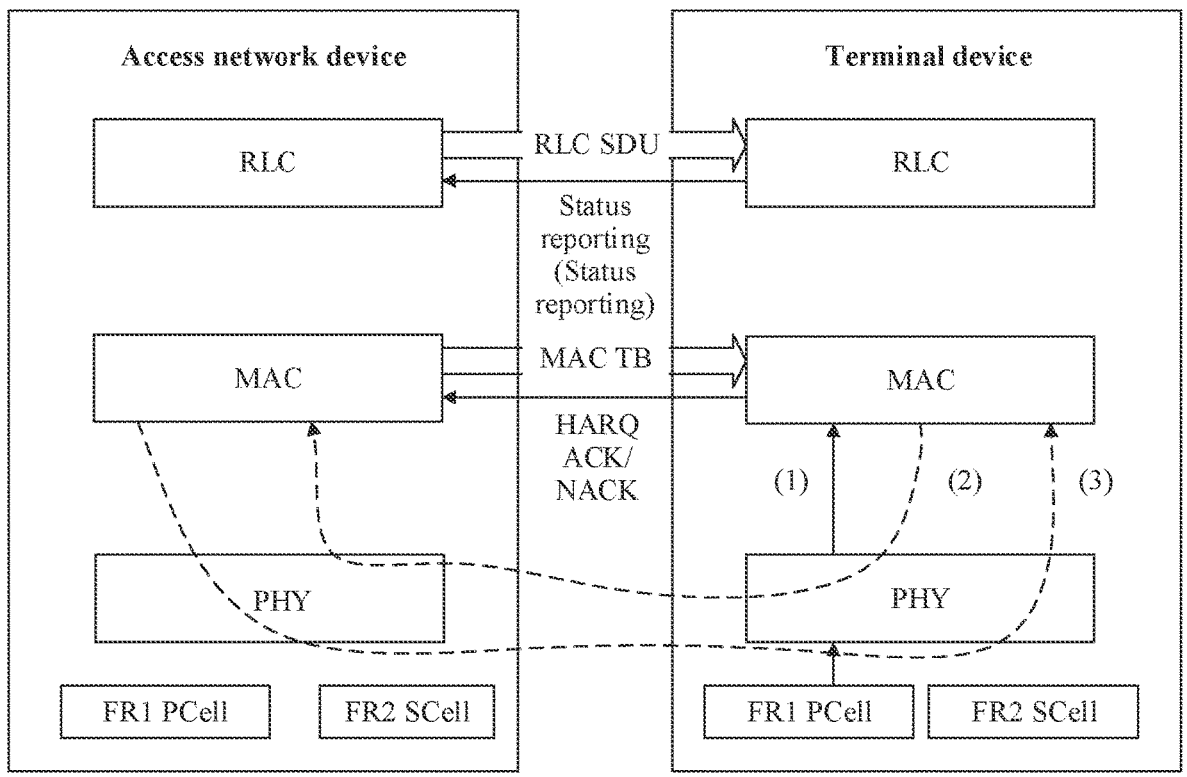
FIG. 3 is a schematic diagram of beam failure detection and beam failure recovery according to an embodiment of this application.

As shown in FIG. 3, processes of beam failure detection and beam failure recovery may include: (1) A physical PHY layer of the terminal device reports a beam failure indication to a MAC layer of the terminal device. (2) The MAC layer of the terminal device performs beam detection after receiving the reported beam failure indication. If it is determined that the beam fails, random access is initiated, and beam failure recovery is started. (3) An access network device completes the beam failure recovery process in response to the random access of the terminal device.

It should be noted that, in the example shown in FIG. 3, an example in which a beam of the PCell in the FR1 is detected is used for description. A process of detecting a beam of another cell is similar to the foregoing process, and is not described herein again.

18. Beam Mismatch

The beam mismatch refers to a case in which data cannot be correctly sent or received because a beam direction of a data transmit end does not match a beam direction of a data receive end. In a 5G communication system, use of multi-antenna and high-frequency channels makes beamforming an important means for improving quality of data transmission and reception. By adjusting a phase and/or an amplitude of a signal on the multi-antenna used to send the signal, beamforming can cause a beam for sending the signal to point in a specific direction, and similarly, can cause a beam for receiving the signal to point in a specific direction. When the direction of the transmit beam is consistent with the direction of the receive beam, a maximum signal strength can be obtained, so that quality of signal receiving is improved. On the contrary, when the direction of the transmit beam differs greatly from the direction of the receive beam, the signal cannot be correctly received. The transmit beam and the receive beam having consistent directions may be referred to as beam matching or beam alignment; the transmit beam and the receive beam having inconsistent directions may be referred to as beam mismatch or beam (alignment) failure. On a high-frequency channel, a signal is blocked by an obstacle or a terminal rotates or moves, so that the beam mismatch is easily caused.

It may be understood that, in descriptions of this application, words such as "first" and "second" are merely used for distinction and description, and cannot be understood as an indication or implication of relative importance, or an indication or implication of an order. Because one cell includes only one downlink carrier, "cell" and "carrier" in this embodiment of this application can be used equivalently. Unless otherwise specified, a cell is used as an example for description in this embodiment of this application.

Figure 4:
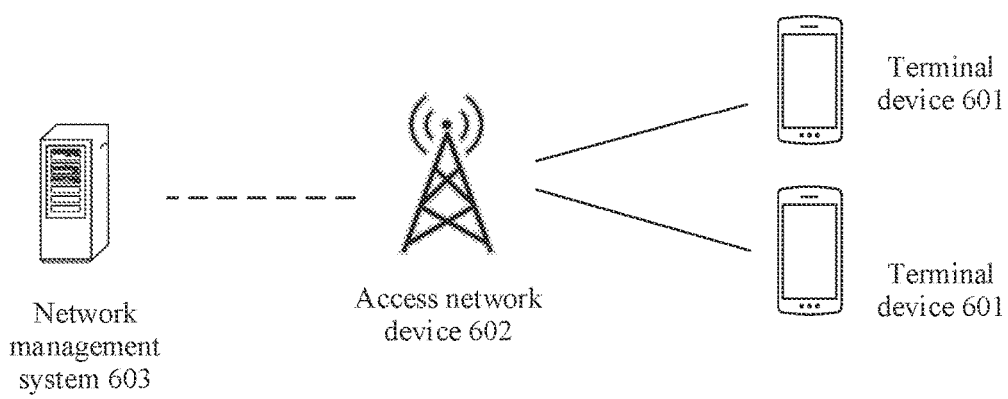
FIG. 4 is a diagram of an architecture of a communication system according to an embodiment of this application.

FIG. 4 is a schematic diagram of a possible network architecture to which an embodiment of this application is applicable. The network architecture includes terminal devices 601 and an access network device 602.

The terminal device 601 may transmit uplink information to an access network device 602 through a Uu air interface, where the uplink information may include uplink data information and/or uplink control information. The Uu air interface may be understood as a universal UE to network interface. Transmission over the Uu air interface may include uplink transmission and downlink transmission. The uplink transmission may mean that the terminal device 601 sends a signal to the access network device 602, and the downlink transmission may mean that the access network device 602 sends a signal to the terminal device 601. The signal transmitted in the uplink transmission may be referred to as uplink information or an uplink signal, and the signal transmitted in the downlink transmission may be referred to as downlink information or a downlink signal.

Optionally, the network architecture shown in FIG. 4 may further include a network management system 603. The terminal device 601 may communicate with the network management system 603 through a wired interface or a wireless interface. For example, in an implementation, the terminal device 601 may communicate with the network management system 603 through the access network device 602. During specific implementation, the network management system 603 may be a network management system of an operator. Similarly, the network management system 603 may also communicate with the terminal device 601 through a wired interface or a wireless interface. For example, in an implementation, the network management system 603 may communicate with the terminal 601 through the access network device 602.

Figure 5:
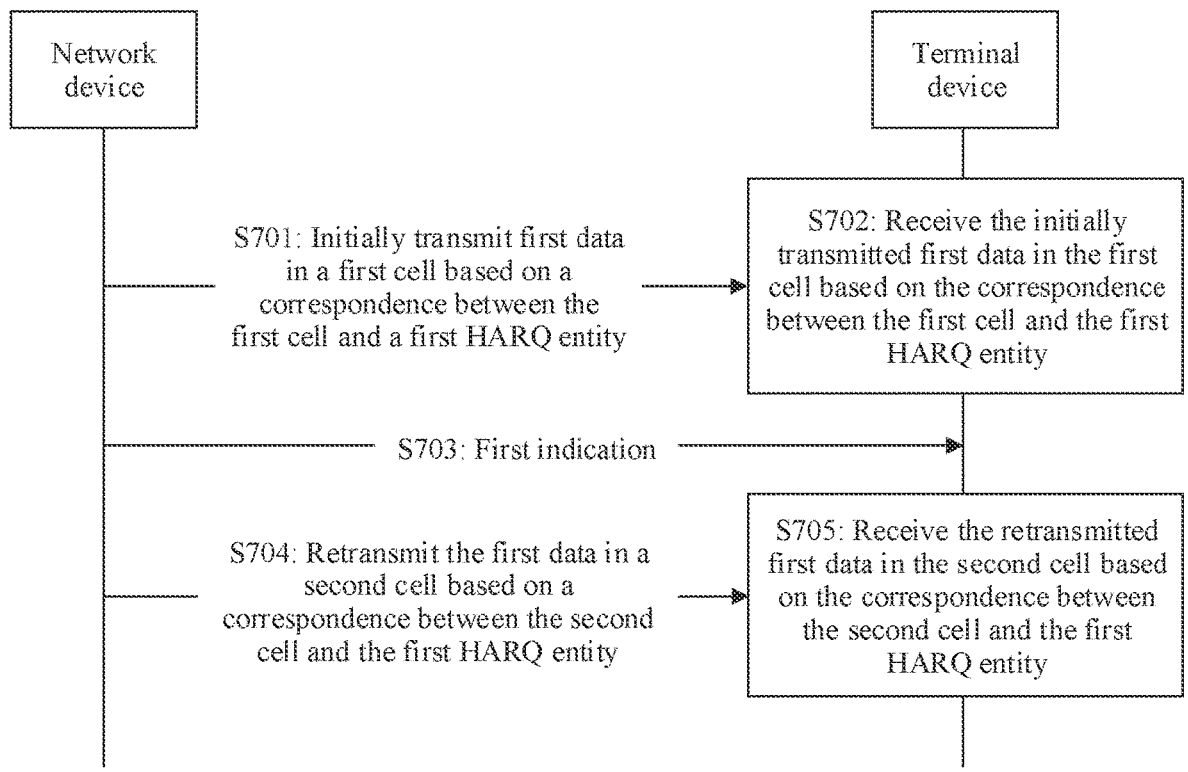
FIG. 5 is a flowchart of a communication method according to an embodiment of this application.

As shown in FIG. 5, a procedure of a communication method is provided. The procedure may be applied to an initial transmission process and a retransmission process of uplink data, or may be applied to an initial transmission process and a retransmission process of downlink data. In this embodiment of this application, an example in which the procedure is applied to the initial transmission process and the retransmission process of the downlink data is used for description. A network device in this procedure may be the access network device 602 in FIG. 4, and a terminal device may be the terminal device 601 in FIG. 4. The procedure is specifically as follows:

S701: The network device initially transmits first data in a first cell based on a correspondence between the first cell and a first HARQ entity. Optionally, the first data may be specifically first downlink data.

S702: The terminal device receives the initially transmitted first data in the first cell based on the correspondence between the first cell and the first HARQ entity.

S703: The network device sends first indication information to the terminal device, where the first indication information is used to indicate a correspondence between a second cell and the first HARQ entity.

S704: The network device sends retransmitted first data in the second cell based on the correspondence between the second cell and the first HARQ entity.

S705: The terminal receives the retransmitted first data in the second cell based on the correspondence between the second cell and the first HARQ entity.

In an example, the network device may establish the correspondence between the second cell and the first HARQ entity. The network device sends the first indication information to the terminal device, to notify the correspondence between the second cell and the first HARQ entity to the terminal device. The first indication information is used to indicate the correspondence between the second cell and the first HARQ entity. Optionally, the network device may first establish the correspondence between the first cell and the first HARQ entity, and then establish the correspondence between the second cell and the first HARQ entity in case of a link interruption of the first cell, a beam mismatch of the first cell, or the like. It may be understood that the foregoing scenario of establishing the correspondence between the second cell and the first HARQ entity is merely an example for description, and is not intended to limit this embodiment of this application.

In another example, the correspondence between the first cell and the first HARQ entity may be first established. The correspondence between the second cell and the first HARQ entity may be established in case of a link interruption of the first cell, a beam mismatch of the first cell, or the like. The second cell may include a plurality of BWPs, for example, a first BWP and a second BWP. The established correspondence between the second cell and the first HARQ entity may be specifically a correspondence between the first BWP and the first HARQ entity. In this case, the network device may send an identifier of the first BWP to the terminal device, to notify the correspondence between the first BWP and the first HARQ entity to the terminal device. The terminal device side may obtain correspondences between different BWPs and HARQ entities, and determine the correspondence between the first BWP and the first HARQ entity based on the identifier of the first BWP and the correspondences between the different BWPs and the HARQ entities. For example, the correspondences between the different BWPs and the HARQ entities may be configured by the network device by using higher layer signaling, may be pre-configured, or may be predefined in a protocol.

In this embodiment of this application, the terminal device may perform detection on the first cell. In addition, when an abnormality such as the link interruption or the beam mismatch of the first cell is detected, the terminal device sends second indication information to notify the network device. The second indication information may include an identifier of the first cell, a flag of the beam mismatch, a flag of beam recovery, and/or the like. Optionally, the second indication information may be specifically RRC signaling, medium access control element (MAC CE) signaling, uplink control information (UCI), or the like.

For example, when the second indication information is RRC signaling, and the RRC signaling includes the identifier of the first cell and the flag of the beam mismatch, a specific format of the RRC signaling may be as follows:

```
BeamDetection ::=         SEQUENCE {
    ServCellID               ServCellIndex,
    BeamFailureDetection     ENUMERATED {True}
}
```

For example, when the second indication information is RRC signaling, and the RRC signaling includes the identifier of the first cell, the flag of the beam mismatch, or the flag of the beam recovery, a specific format of the RRC signaling may be as follows:

```
BeamDetection ::=         SEQUENCE {
    ServCellID               ServCellIndex,
    BeamDetection            ENUMERATED { Failure,Recovery }
}
ServCellIndex ::=         INTEGER (0..maxNrofServingCells-1)
```

Figure 6:
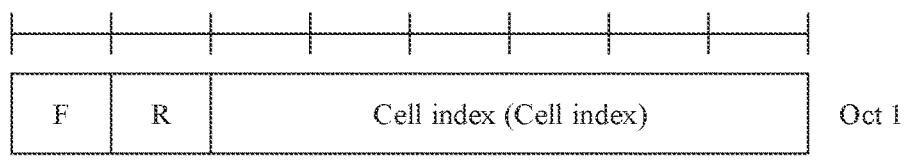
FIG. 6 is a schematic diagram of an RRC according to an embodiment of this application.

For example, as shown in FIG. 6, when the second indication information is MAC CE signaling, the MAC CE may include an index of the first cell and a flag of a beam failure. A quantity of bits of the index of the first cell may be 4 bits, 5 bits, 6 bits, or the like. In the example shown in FIG. 6, an example in which the index of the first cell has 6 bits is used for description. It may be understood that, in the example shown in FIG. 6, F is used to represent the flag of the beam failure, Cell index represents the index of the first cell, and R represents a reserved bit. For example, when location information of F is 1, it may indicate that a beam failure is detected in a cell indicated by subsequent Cell index; when location information of F is 0, it may indicate beam failure recovery in a cell indicated by subsequent Cell index.

Figure 7:
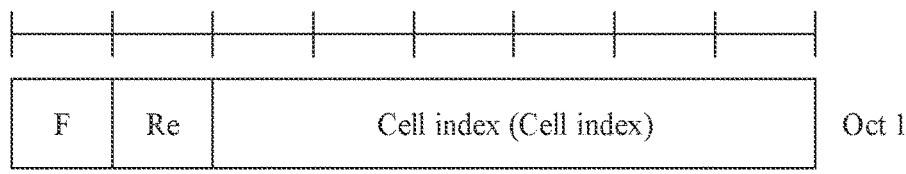
FIG. 7 is another schematic diagram of an RRC according to an embodiment of this application.

For example, as shown in FIG. 7, when the second indication information is MAC CE signaling, the MAC CE may include an index of the first cell, a flag of a beam failure, and the flag of the beam recovery. A quantity of bits of the index of the first cell may be 4 bits, 5 bits, 6 bits, or the like. In the example shown in FIG. 7, an example in which the index of the first cell has 6 bits is used for description. It may be understood that, in the example shown in FIG. 7, F is used to represent the flag of the beam failure, Re represents the flag of the beam recovery, and Cell index represents the index of the first cell. For example, when location information of F is 1, it may indicate that a beam failure is detected in a cell indicated by subsequent Cell index; when location information of Re is 1, it may indicate beam failure recovery in a cell indicated by subsequent Cell index.

For example, when the second indication information is UCI, the UCI may be carried in a physical uplink control channel (PUCCH) for transmission, or the UCI may be carried in a physical uplink shared channel (PUSCH) for transmission.

It can be learned from the foregoing description that the first data is initially transmitted in the first cell, and the first data is retransmitted in the second cell. When a channel bandwidth of the first cell is larger than a channel bandwidth of the second cell (for example, the first cell may correspond to a cell in FR2, and the channel bandwidth may be 400 MHz; the second cell may correspond to a cell in FR1, and the channel bandwidth may be 100 MHz), to ensure that the initially transmitted data and the retransmitted data correspond to same original information data, the first data may be divided into a plurality of data blocks and transmitted for a plurality of times during first data retransmission. The data blocks may be transmitted for the plurality of times in a same cell, or in different cells. In this embodiment of this application, an example in which the first data is divided into a first data block and a second data block is used for description.

For example, an example in which the first data block and the second data block are transmitted in a same cell, and the cell is the second cell is used for description.

The network device may send first DCI to the terminal device, where the first DCI is used to schedule retransmission of the first data block. Optionally, the first DCI is further used to indicate at least one of an index of the first data block, a start identifier, or an end identifier. The start identifier indicates the first retransmitted data block in the retransmitted first data, and the end identifier indicates the last retransmitted data block in the retransmitted first data. The network device may retransmit the first data block in the second cell based on the correspondence between the second cell and the first HARQ entity. Correspondingly, the terminal device may receive the retransmitted first data block in the second cell based on the correspondence between the second cell and the first HARQ entity.

The network device may send second DCI to the terminal device, where the second DCI is used to schedule retransmission of the second data block. Optionally, the second DCI is further used to indicate at least one of an index of the second data block, a start identifier, or an end identifier. The start identifier indicates the first retransmitted data block in the retransmitted first data, and the end identifier indicates the last retransmitted data block in the retransmitted first data. The network device may receive the retransmitted second data block in the second cell based on the correspondence between the second cell and the first HARQ entity. Correspondingly, the terminal device may receive the retransmitted second data block in the second cell based on the correspondence between the second cell and the first HARQ entity.

For example, an example in which the first data block and the second data block are transmitted in different cells, the first data block is transmitted in the second cell, and the second data block is transmitted in a third cell is used for description, where the second cell is different from the third cell.

For a process in which the network device retransmits the first data block, refer to the descriptions in the foregoing example. Details are not described herein again.

The network device may send third DCI to the terminal device, where the third DCI is used to schedule retransmission of a third data block. Optionally, the third DCI is further used to indicate at least one of an index of the second data block, a start identifier, or an end identifier. The start identifier indicates the first retransmitted data block in the retransmitted first data, and the end identifier indicates the last retransmitted data block in the retransmitted first data. The network device may send the retransmitted second data block in the third cell based on a correspondence between the third cell and the first HARQ entity. Correspondingly, the terminal device may receive the retransmitted second data block in the third cell based on the correspondence between the third cell and the first HARQ entity.

When a channel bandwidth and channel quality of initial transmission are greatly different from those of retransmission, the foregoing method can be used to ensure that a transport block size of the initial transmission is the same as that of the retransmission. It may be understood that in this embodiment of this application, an example in which the first data is divided into the first data block and the second data block is used for description. This is not intended to limit this application. For example, the first data may be divided into N data blocks. A value of N may be a value other than 2. The N data blocks may be transmitted in a same cell, or may be transmitted in different cells.

In this embodiment of this application, the following application scenario is provided. In this application scenario, the first data may be corresponding to a TB2, the first data block may be corresponding to a CBG1, and the second data block may be corresponding to a CBG2. For an explanation of the TB, refer to the description in the 14th part of the foregoing term explanations. For an introduction to the CBG, refer to the description in the 15th part of the foregoing term explanations. The first cell may correspond to a cell 2, the second cell may correspond to a cell 1, and the third cell may correspond to a cell 3. The first HARQ entity may correspond to a HARQ entity 2, and a second HARQ entity may correspond to a HARQ entity 1.

Figure 8:
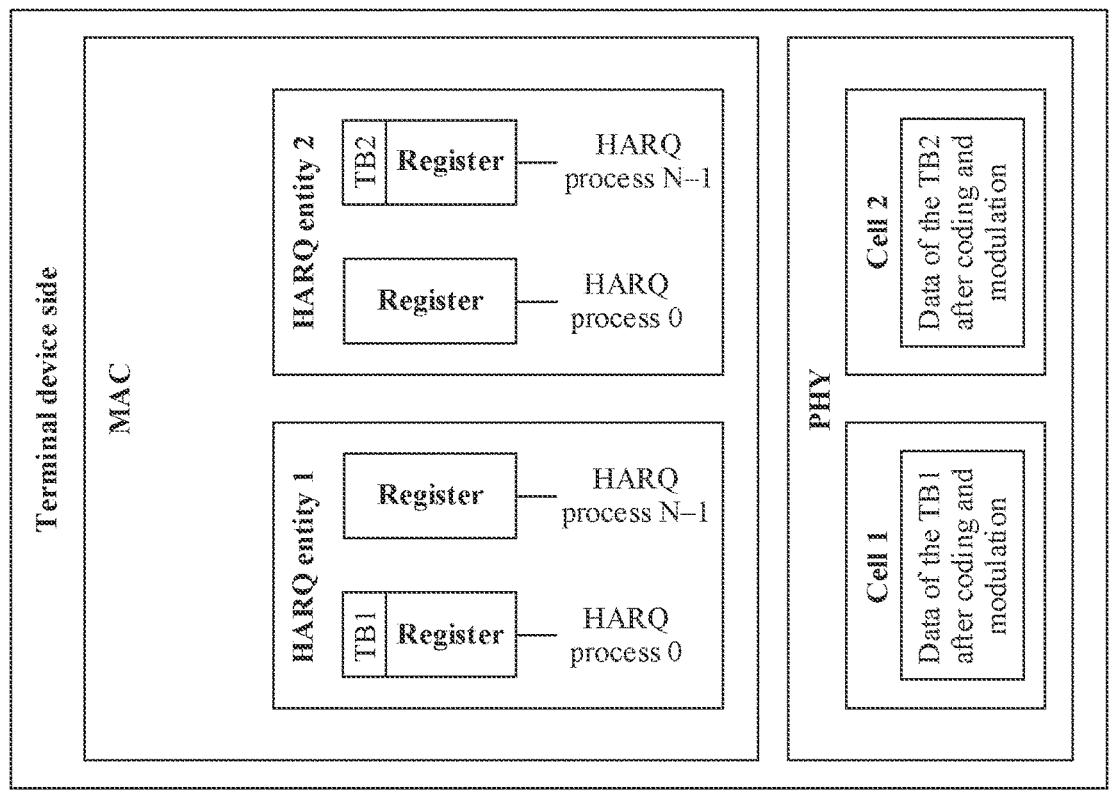
FIG. 8 is a schematic diagram of transmission of a TB1 and a TB2 according to an embodiment of this application.
Figure 8:
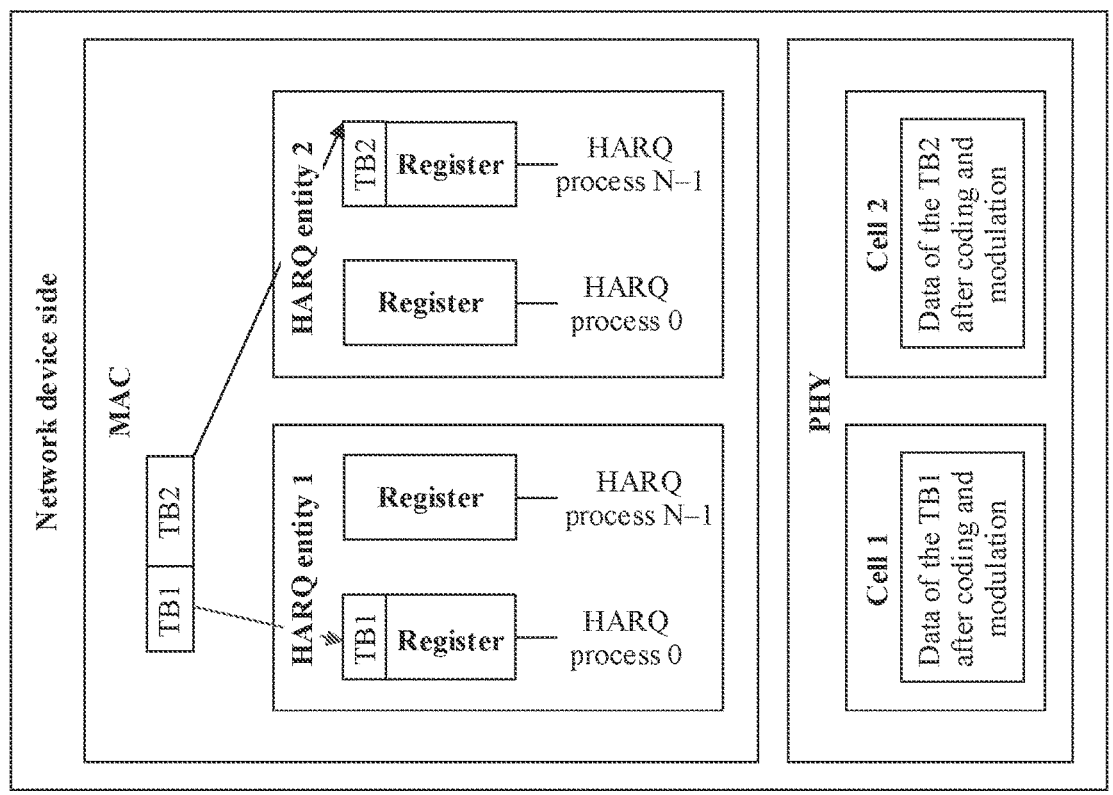

In an example, as shown in FIG. 8, a MAC layer on a network device side includes two pieces of to-be-transmitted data: the TB1 and the TB2. During initial transmission, the TB1 is transmitted in the cell 1, and data of the TB1 is stored in a buffer of the HARQ entity 1; the TB2 is transmitted in the cell 2, and data of the TB2 is stored in a buffer of the HARQ entity 2.

In this embodiment of this application, a correspondence between the HARQ entity 1 and the cell 1 and a correspondence between the HARQ entity 2 and the cell 2 may be established, and same correspondences are maintained during data initial transmission and retransmission. The correspondence between the cell and the HARQ entity may be considered as a default correspondence between the cell and the HARQ entity. For the foregoing example, as shown in FIG. 8, during initial transmission and retransmission, the TB1 is transmitted by using a HARQ process 0 of the HARQ entity 1 in the cell 1; during initial transmission and retransmission, the TB2 is transmitted by using a HARQ process N−1 of the HARQ entity 2 in the cell 2. It can be learned that, in a mapping architecture between the cell and the HARQ entity in this example, initial transmission and retransmission of the TB1 can be performed only in the cell 1, and initial transmission and retransmission of the TB2 can be performed only in the cell 2. For data that has been initially transmitted, to support cross-carrier data retransmission, a cell in which the data is retransmitted can be changed only through retransmission of higher-layer data, and soft information combination cannot be performed to obtain a gain. As a result, the procedure takes a long time, resulting in low retransmission efficiency.

In this example, if a blockage occurs in the cell 2 because of blocking of an obstacle, rotating or moving of the terminal device, or the like, the terminal device needs to re-align a transmit beam and/or a receive beam. A beam alignment process may be referred to as beam recovery. For the beam recovery, refer to the description in the 18th part of the foregoing term explanations. In the foregoing beam recovery process, in the cell 2, the network device and the terminal device cannot perform normal data transmitting and receiving. Consequently, an upper layer (for example, a TCP layer) of a data transmitting device cannot receive a correct receiving feedback of a data packet under a specific condition. Therefore, a congestion control procedure at the TCP layer of the transmitting device may enter a congestion control stage, a data transmit end actively reduces a throughput of data input to a radio access network side, and data throughput performance of the entire radio access network side is reduced. For TCP congestion control, refer to the description in the 17th part of the foregoing term explanations.

For the foregoing process, this application provides the following solutions: a first solution and a second solution. The first solution may correspond to the procedure shown in FIG. 5 and the solution corresponding to Embodiment 2.

For example, the first solution is as follows: A correspondence between the HARQ entity 2 and the cell 1 is established, and the network device side retransmits the TB2 in the cell 1. Correspondingly, the terminal device side receives the retransmitted TB2 in the cell 1.

Figure 9:
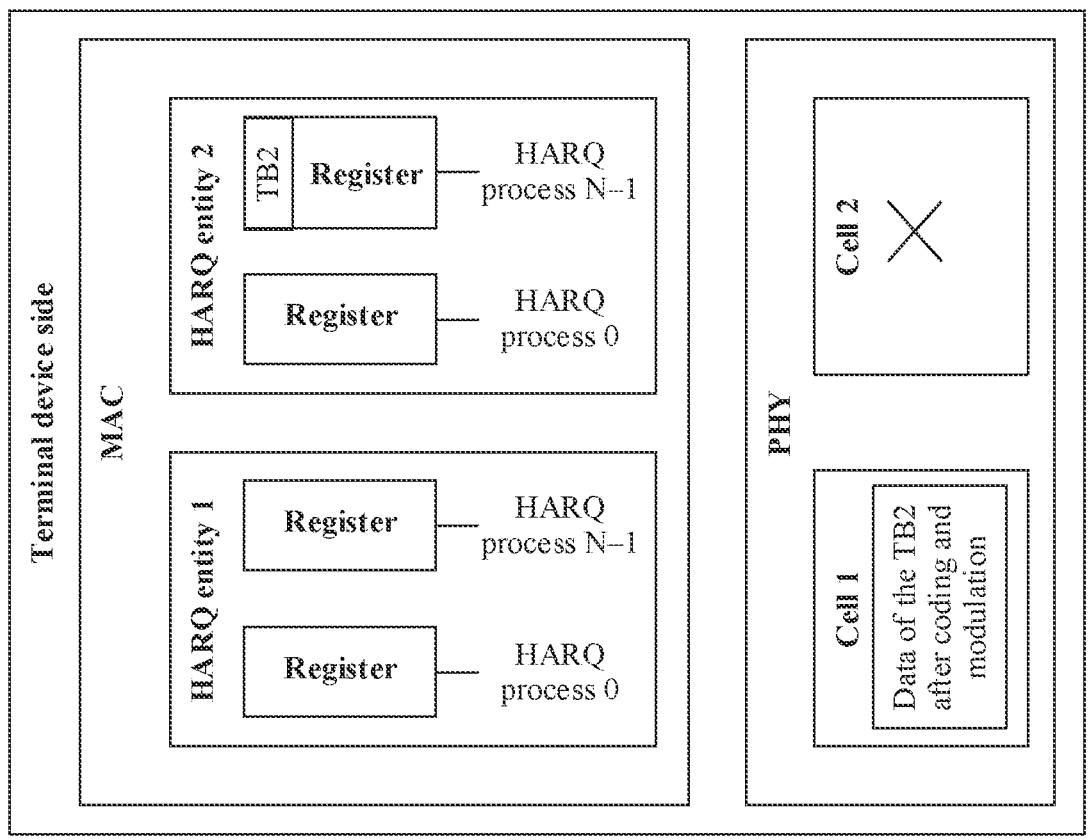
FIG. 9 is a schematic diagram of retransmission of a TB2 according to an embodiment of this application.
Figure 9:
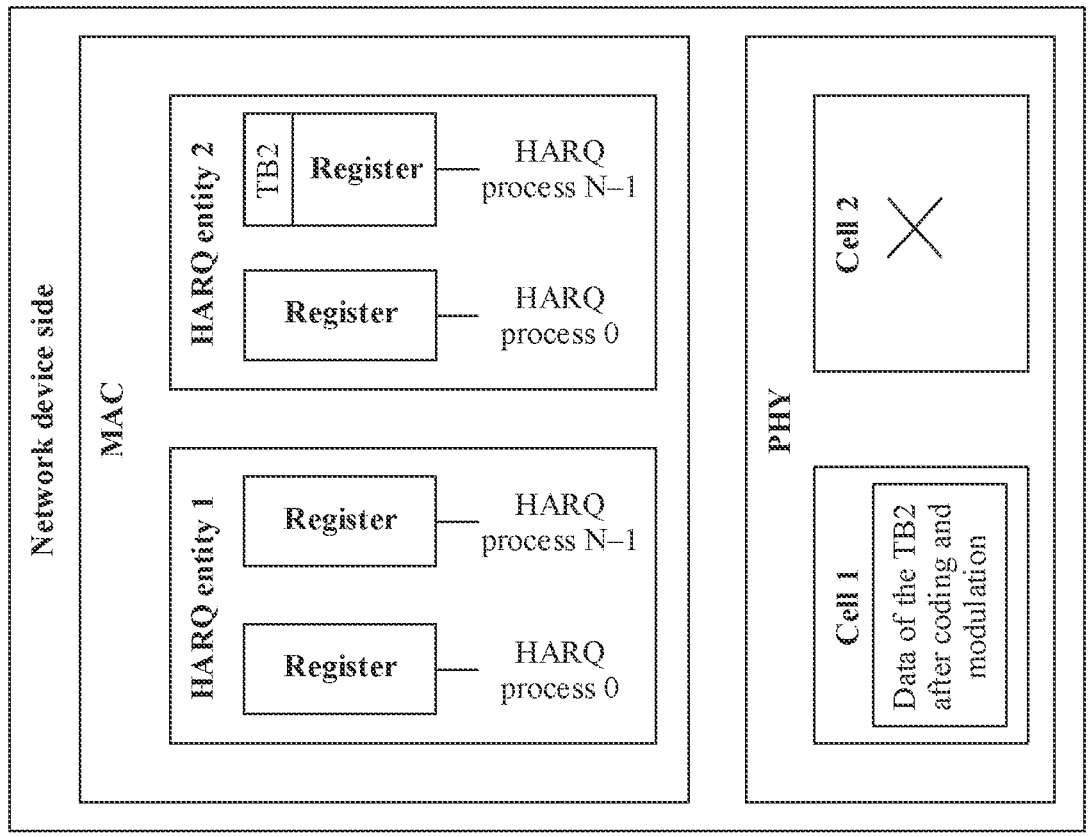

As shown in FIG. 9, the MAC layer of the network device side may establish the correspondence between the HARQ entity 2 and the cell 1, and the MAC layer may notify the correspondence between the HARQ entity 2 and the cell 1 to the PHY layer. The PHY layer of the network device side may notify the correspondence between the HARQ entity 2 and the cell 1 through an air interface to the terminal device. Specifically:

For example, the cell 1 includes a BWP 1 and a BWP 2, and correspondences between different BWPs and HARQ entities may be pre-established. For example, a correspondence between the BWP 1 and the HARQ entity 1 may be established, and the BWP 1 is used to transmit data in the HARQ entity 1; a correspondence between the BWP 2 and the HARQ entity 2 may be established, and the BWP 2 is used to transmit data in the HARQ entity 2. Configurations of the BWP 1 and the BWP 2 may be the same or different. For example, physical resources and other related parameters configured for the BWP 1 and the BWP 2 may be the same or different. It may be understood that when configurations, except BWP IDs, of the BWP 1 and the BWP 2 are the same, it may be considered that only a source of HARQ data sent or received by the BWP is changed. For example, a source of HARQ data of the BWP 1 is the HARQ entity 1, and a source of HARQ data of the BWP 2 is the HARQ entity 2. Alternatively, it may be described as that: A mapping relationship between the BWP and the HARQ entity is changed. For example, a HARQ entity to which the BWP 1 is mapped is the HARQ entity 1, and a HARQ entity to which the BWP 2 is mapped is the HARQ entity 2. Alternatively, it may be described as that: A BWP-related radio frequency parameter, a baseband parameter, and the like are not changed. In this case, time for switching an active BWP from the BWP 1 to the BWP 2 is very short, and data transmitting efficiency is not affected. When the configurations, except the BWP IDs, of the BWP 1 and the BWP 2 are different, it may be considered that, besides that the source of HARQ data of the BWP is changed, a configuration of a sending resource or a sending parameter is also changed. Alternatively, it may be described as that: At the same time when the mapping relationship between the BWP and the HARQ entity is changed, a radio frequency parameter, a baseband parameter, or the like of the BWP is changed. In this case, a specific period of time for switching the active BWP from the BWP 1 to the BWP 2 is required. The BWP switching may be controlled by using RRC signaling, a timer, a PDCCH indication, a MAC entity, or the like. The network side may change the correspondence between the cell and the HARQ entity by switching the active BWP.

For example, in the correspondence between the BWP and the HARQ entity, the BWP may be represented by using a BWP ID, the HARQ entity may be represented by using a HARQ entity ID, or the HARQ entity may be represented by using a cell identifier corresponding to the HARQ entity by default. The cell identifier may be an index value configured for the cell, a cell ID, or the like. In the following example, an example in which the cell identifier is the cell index value is used for description. For example, the BWP 1 is corresponding to the HARQ entity 1, and the BWP 2 is corresponding to the HARQ entity 2. An ID of the BWP 1 is 1, an ID of the BWP 2 is 2, an ID of the HARQ entity 1 is 1, an ID of the HARQ entity 2 is 2, an index of a cell corresponding to the HARQ entity 1 by default is 1, and an index of a cell corresponding to the HARQ entity 2 by default is 2. The correspondence between the BWP 1 and the HARQ entity 1 may be represented as: A BWP ID 1 is corresponding to a HARQ entity ID 1, or the BWP ID 1 is corresponding to a cell index 1. The correspondence between the BWP 2 and the HARQ entity 2 may be represented as: A BWP ID 2 is corresponding to a HARQ entity ID 2, or the BWP ID 2 is corresponding to a cell index 2.

The established correspondence between the BWP and the HARQ entity may be represented in the following manner:

Manner 1: An information element (IE) is added to the BWP configuration, where the IE is used to indicate a configured correspondence between the BWP and the HARQ entity. For example, the IE may indicate the ID of the HARQ entity or the cell index. For example, in the foregoing example, the BWP 1 is corresponding to the HARQ entity 1, and an IE may be added to the configuration of the BWP 1, where the IE may indicate the HARQ entity ID 1, or the IE may indicate the cell index 1. Similarly, the BWP 2 is corresponding to the HARQ entity 2, and an IE may be added to the configuration of the BWP 2, where the IE may indicate the HARQ entity ID 2, or the IE may store the cell index 2.

Figure 10:
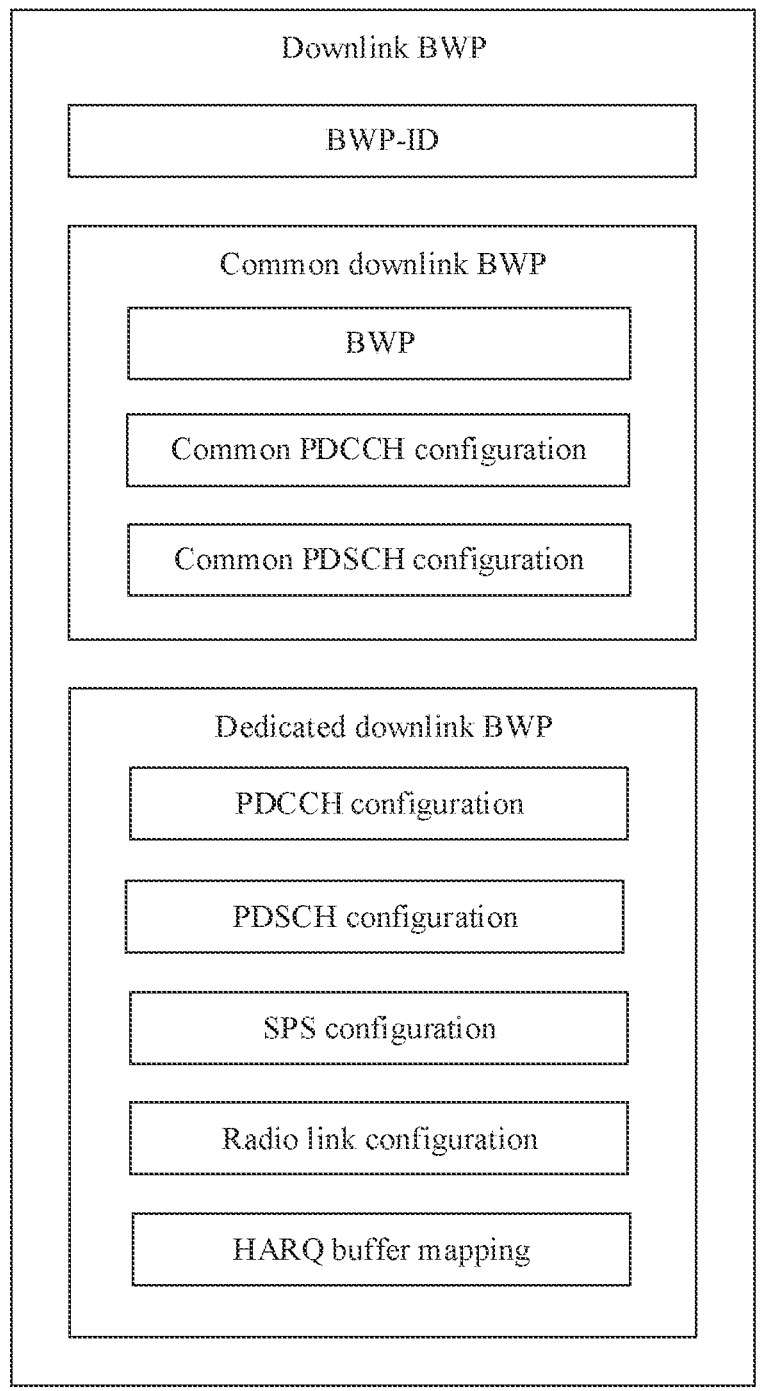
FIG. 10 is a schematic diagram of a BWP configuration according to an embodiment of this application.

For example, as shown in FIG. 10, the newly added IE may be referred to as a HARQ buffer mapping. Optionally, a downlink BWP configuration is used as an example. As shown in FIG. 10, configuration information of the BWP may further include a BWP ID, common downlink BWP (BWP DL common) configurations, and dedicated downlink BWP (BWP DL dedicated) configurations. The common downlink BWP configurations may include a common PDCCH configuration (PDCCH-Config Comm) and a common PDSCH configuration (PDSCH-Config Comm). The dedicated downlink BWP configurations may include a PDCCH configuration (PDCCH Config), a PDSCH configuration (PDSCH-Config), a semi-persistent scheduling configuration (semi-persistent scheduling config, SPS config), a radio link configuration (radio link config), a HARQ buffer mapping (HARQ buffer mapping), and the like.

For example, a format of the downlink BWP configuration may be further represented as:

```
BWP-DownlinkDedicated ::=      SEQUENCE {
    pdcch-Config                   SetupRelease { PDCCH-Config }
OPTIONAL, -- Need M
    pdsch-Config                   SetupRelease { PDSCH-Config }
OPTIONAL, -- Need M
    sps-Config                     SetupRelease { SPS-Config }
OPTIONAL, -- Need M
    radioLinkMonitoringConfig      SetupRelease { RadioLinkMonitoringConfig }
OPTIONAL, -- Need M
    HARQBufferMapping              HARQEntityId
OPTIONAL, -- Need M
    ...
}
```

In the format of the downlink BWP configuration, a name of the newly added IE may be HARQ buffer mapping. For details, refer to fields in bold in the foregoing example. The HARQ buffer mapping may include a HARQ entity ID (HARQ Entity Id). For example, if the BWP 1 is corresponding to the HARQ entity 1, the HARQ buffer mapping includes a HARQ entity ID 1, that is, the HARQ entity ID includes the HARQ entity ID 1.

Further, the HARQ entity ID may be a positive integer greater than or equal to 0 and less than or equal to N, where N indicates a maximum quantity of HARQ entities. Alternatively, it may be described as that: HARQEntityId::=INTEGER (0 . . . maxNrofHARQEntitys−1), where "maxNrofHARQEntitys" indicates the maximum quantity of HARQ entities.

For example, the format of the downlink BWP configuration may be further represented as:

```
BWP-DownlinkDedicated ::=      SEQUENCE {
    pdcch-Config                   SetupRelease { PDCCH-Config }
OPTIONAL, -- Need M
    pdsch-Config                   SetupRelease { PDSCH-Config }
OPTIONAL, -- Need M
    sps-Config                     SetupRelease { SPS-Config }
OPTIONAL, -- Need M
    radioLinkMonitoringConfig  SetupRelease { RadioLinkMonitoringConfig }
OPTIONAL, -- Need M
    HARQBufferMapping              ServCellIndex
OPTIONAL, -- Need M
    ...
}
```

In the format of the downlink BWP configuration, a name of the newly added IE may be HARQ buffer mapping. For details, refer to fields in bold in the foregoing example. The HARQ buffer mapping may include a serving cell index (ServCell Index). For example, if the BWP 1 is corresponding to a serving cell 1, the HARQ buffer mapping includes a cell index 1, that is, the ServCell Index includes the cell index 1. The ServCell Index may be a positive integer greater than or equal to 0 and less than or equal to M, where M represents a maximum quantity of cells. Alternatively, it may be described as: ServCellIndex::=INTEGER (0 . . . maxNrofServingCells−1), where "maxNrofServingCells" indicates a maximum quantity of cells.

Manner 2. During cell-level configuration, a correspondence between the BWP and the HARQ entity is added. For example, still in the foregoing example, an identifier of the BWP 1, for example, a BWP ID 1, may be added to the configuration of the cell 1; an identifier of the BWP 2, for example, a BWP ID 2, may be added to the configuration of the cell 2.

Figure 17:
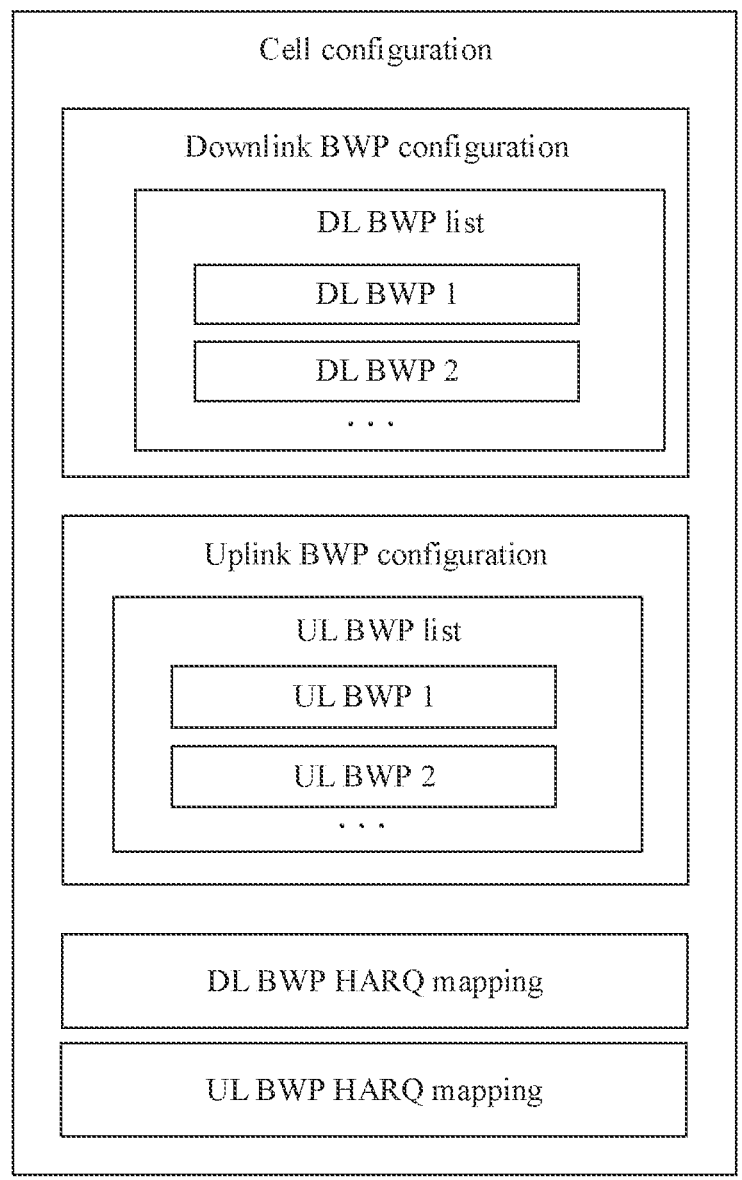
FIG. 17 is a schematic diagram of a cell configuration according to an embodiment of this application.

For example, as shown in FIG. 17, in a format of a cell configuration (Serving Cell Config), the newly added IE may be referred to as a downlink BWP HARQ mapping (DL BWP HARQ mapping) and/or an uplink BWP HARQ mapping (UL BWP HARQ mapping). Optionally, as shown in FIG. 17, the cell configuration may further include a downlink BWP configuration (DL BWP config) and an uplink BWP configuration (UL BWP config). The downlink BWP configuration may include release and increase of a downlink BWP list, and the uplink BWP configuration may include release and increase of an uplink BWP list.

For example, the format of the cell configuration may be represented as.

```
ServingCellConfig ::=                             SEQUENCE {
    ...
    downlinkBWP-ToReleaseList SEQUENCE (SIZE (1..maxNrofBWPs)) OF BWP-Id
OPTIONAL, -- Need N
    downlinkBWP-ToAddModList SEQUENCE (SIZE (1..maxNrofBWPs)) OF
BWP-Downlink OPTIONAL, -- Need N
    ...
  uplinkConfig
OPTIONAL, -- Need M
  downlinkBwpHarqMapping SEQUENCE (SIZE (1..maxNrofBWPs))
DlBwpHarqMapping OPTIONAL, -- Need M
  uplinkBwpHarqMapping SEQUENCE (SIZE (1..maxNrofBWPs))
UlBwpHarqMapping OPTIONAL, -- Need M
}
```

It can be learned from the foregoing example that the format of the cell configuration includes the DL BWP HARQ mapping and the UL BWP HARQ mapping. For details of the DL BWP HARQ mapping and the UL BWP HARQ mapping, refer to bold parts in the foregoing cell configuration.

Further, an IE format of the DL BWP HARQ mapping or the UL BWP HARQ mapping may be expressed as:

```
DlBwpHarqMapping ::=        SEQUENCE {
  bwp-Id                    HARQEntityId
}
UlBwpHarqMapping ::=        SEQUENCE {
  bwp-Id                    HARQEntityId
}
```

Alternatively, the IE formats of the DlBwpHarqMapping and the UlBwpHarqMapping may be:

```
DlBwpHarqMapping ::=        SEQUENCE {
  bwp-Id                    ServCellIndex
}
UlBwpHarqMapping ::=        SEQUENCE {
  bwp-Id                    ServCellIndex
```

It can be learned from the foregoing that the correspondence between the BWP ID and the HARQ entity ID may be added to the DL BWP HARQ mapping or the UL BWP HARQ mapping, or a correspondence between the BWP ID and the serving cell index may be added. For the correspondence between the BWP ID and the HARQ entity ID or the correspondence between the BWP ID and the serving cell index, refer to the foregoing description in bold.

For example, when the active BWP in the cell 1 is the BWP 1, the cell 1 sends the data of the HARQ entity 1, or it may be expressed as that the cell 1 is corresponding to the HARQ entity 1; after the active BWP in the cell 1 is switched to the BWP 2, the cell 1 sends the data of the HARQ entity 2, or it may be expressed as that the cell 1 is corresponding to the HARQ entity 2.

It may be understood that in this embodiment of this application, when different BWP IDs are configured in one cell, during data transmission, physical resources corresponding to the BWP IDs are still in the cell. For example, the BWP 1 and the BWP 2 are configured in the cell 1. To be specific, a correspondence between the BWP 1 and the HARQ entity 2 and a correspondence between the BWP 2 and the HARQ entity 1 may be configured. Although the BWP 1 is used to transmit data of the HARQ entity 2 in the cell 2, a physical resource corresponding to the BWP 2 is still in the cell 1.

In this embodiment of this application, after receiving the retransmitted TB2, the terminal device may determine, based on the correspondence between the BWP and the HARQ entity, the HARQ entity corresponding to the current BWP. Then, the terminal device finds, based on the determined HARQ entity, a buffer in which decoding soft information of an initially transmitted TB2 is stored, and soft information of the initially transmitted TB2 and soft information of the retransmitted TB2 are combined and decoded, so that data receiving performance is improved.

Figure 11:
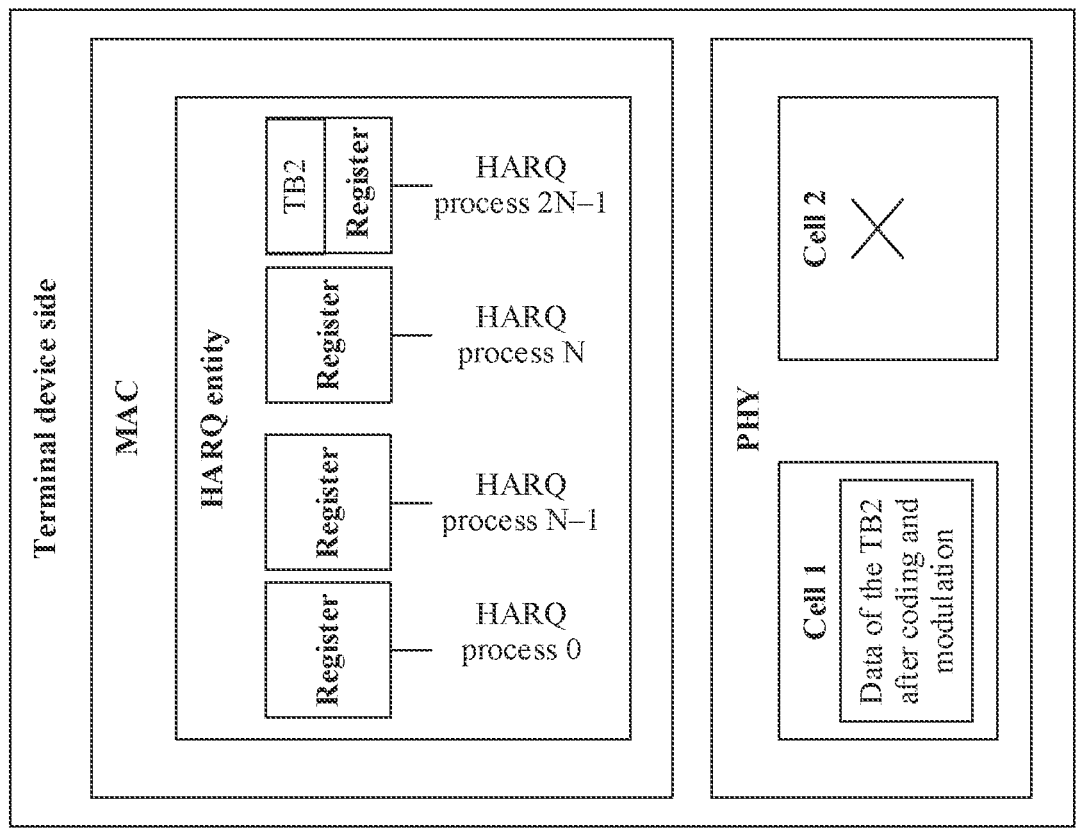
FIG. 11 is a schematic diagram of retransmission of a TB2 according to an embodiment of this application.
Figure 11:
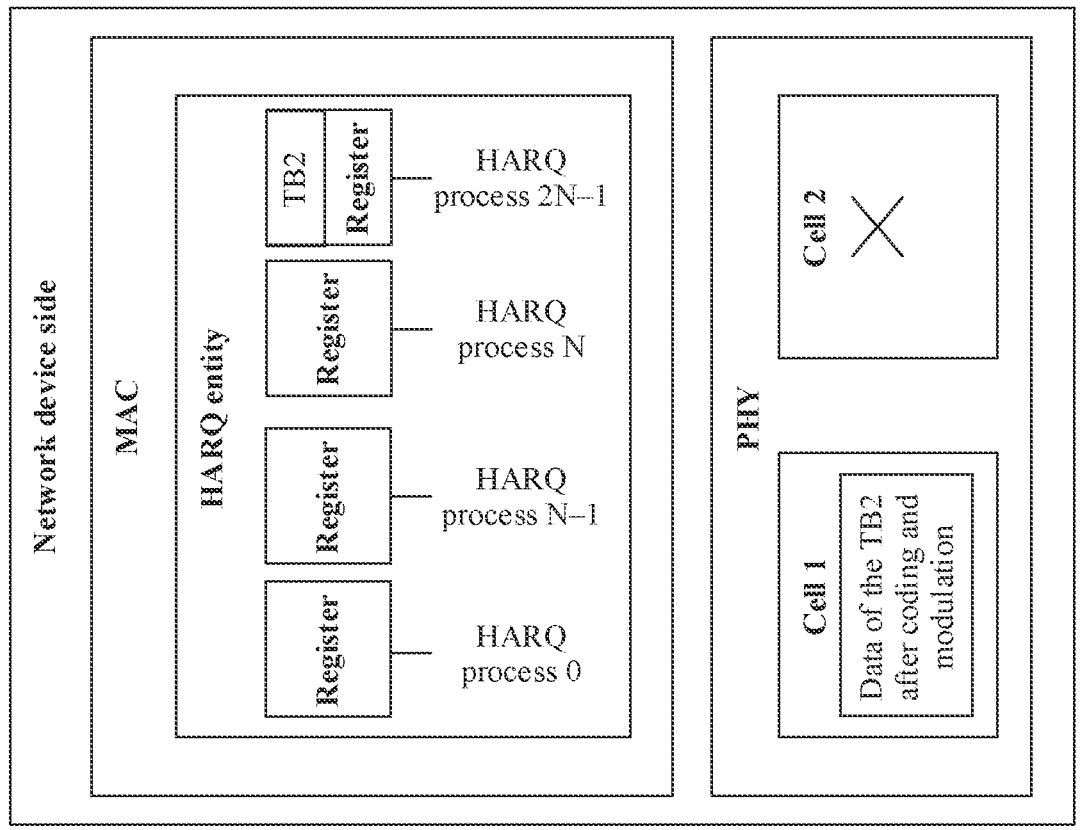

For example, the second solution is as follows: Only one HARQ entity is configured at the MAC layer, and the HARQ entity is corresponding to all cells. For example, as shown in FIG. 11, only one HARQ entity is configured at the MAC layer, and the HARQ entity is corresponding to the cell 1 and the cell 2, that is, the HARQ entity has correspondences with both the cell 1 and the cell 2. In a case in which a link interruption or a beam mismatch occurs in the cell 2, retransmission of the TB2 may be switched to the cell 1.

It may be understood that in the second solution, the following problems need to be addressed:

(1) A quantity of HARQ processes in the HARQ entity at the MAC layer of the network device side is expanded based on a quantity of cells. For example, still refer to FIG. 11. When one HARQ entity corresponds to one cell, one HARQ entity includes N−1 HARQ processes. When one HARQ entity corresponds to two cells, one HARQ entity includes 2N−1 HARQ processes.

(2) The MAC layer of the network device side notifies a correspondence between the HARQ process and the cell to the PHY layer. The PHY layer of the network device notifies a correspondence between the HARQ process and the cell to the terminal device. For example, the network device side may notify the correspondence between the HARQ process and the cell to the terminal device by using RRC signaling, MAC CE signaling, DCI, and the like.

In this embodiment of this application, the DCI may include a HARQ process field, and a quantity of bits in the HARQ process field may be expanded based on the quantity of HARQ processes. For example, when originally one HARQ entity is corresponding to one cell, and one HARQ entity includes 16 HARQ processes, the quantity of bits of the HARQ process field is four bits, and the four bits can support information indication of a maximum quantity of 16 HARQ processes. When one HARQ entity is corresponding to two cells, and one HARQ entity includes 32 HARQ processes, the quantity of bits of the HARQ process field needs to be expanded from four bits to five bits, so that information indication of a maximum quantity of 32 HARQ processes can be supported.

In this embodiment of this application, after receiving the retransmitted TB2, the terminal device needs to determine, based on the correspondence between the HARQ process and the cell, a HARQ process for transmitting the TB2, namely, a HARQ process 2N−1 in FIG. 11. Then, the terminal device finds the initially transmitted TB2 in a buffer (buffer) corresponding to the HARQ process 2N−1. The terminal device performs soft combining and decoding on soft information of the initially transmitted TB2 and soft information of the retransmitted TB2, to improve data receiving performance.

For example, in this embodiment of this application, for HARQ retransmission, the soft information of the initial transmission and the retransmission may be combined to obtain a performance gain. Therefore, it needs to be ensured that transport block sizes (transport block sizes, TBSs) of the initial transmission and the retransmission are equal. In this embodiment of this application, when channel bandwidths and quality of the cell 1 and the cell 2 differ greatly, or it may be described as that when channel bandwidths and quality of the initial transmission and the retransmission of the TB2 differ greatly, how to ensure that TBSs for the initial transmission and the retransmission are the same is a problem to be resolved in this embodiment of this application. A principle for resolving this problem is as follows: When a channel bandwidth of the retransmitted TB2 is less than a channel bandwidth of the initially transmitted TB2, or it may be described as that when a channel bandwidth of the cell 1 is less than a channel bandwidth of the cell 2, the retransmitted TB2 may be divided into a plurality of CBGs. For an introduction to the CBG, refer to the description in the 15th part of the foregoing term explanations. In addition, in this embodiment of this application, an example in which one TB is transmitted in one scheduling time unit is used for description. The scheduling time unit may also be referred to as a time unit.

As shown in FIG. 8, when the TB2 is initially transmitted in the cell 2, a quantity of bits of the TB2 allocated by the network device to the terminal device may be referred to as a transport block size of the initially transmitted TB2 (TB2_TBS_initial). The transport block size of the initially transmitted TB2 is determined based on a quantity of RBs allocated by the network device to the terminal device and an MCS indication. Optionally, the quantity of RBs allocated by the network device to the terminal device may also be referred to as a quantity of RBs initially allocated to the cell 2 (Cell 2_RBNum_initial), and the MCS indication may also be referred to as an MCS index initially allocated to the cell 2 (Cell 2_MCS_initial index). The quantity of RBs allocated by the network device to the terminal device is determined based on CQI that is of the cell 2 and that is reported by the terminal device.

When the TB2 is retransmitted in the cell 1, the network device determines, based on CQI information that is of the cell 1 and that is reported by the terminal device, an MCS retransmitted in the cell 1. Optionally, the MCS retransmitted in the cell 1 may also be referred to as a Cell1_MCS_ReTx. A transport block size of the TB2 retransmitted in the cell 1 needs to be equal to the transport block size of the initially transmitted TB2. Therefore, a quantity of RBs required when the TB2 is retransmitted in cell 1 may be determined based on the MCS retransmitted in cell 1 and the transport block size of the initially transmitted TB2.

For example, in this embodiment of this application, when a quantity of RBs required when the TB2 is retransmitted in the cell 1 is less than or equal to a quantity of RBs available to the cell 1, the network device may allocate, based on normal RB resource allocation, RBs for retransmission of the TB2. Optionally, the quantity of RBs available to the cell 1 may also be referred to as Cell 1_RBNum_available.

Figure 12:
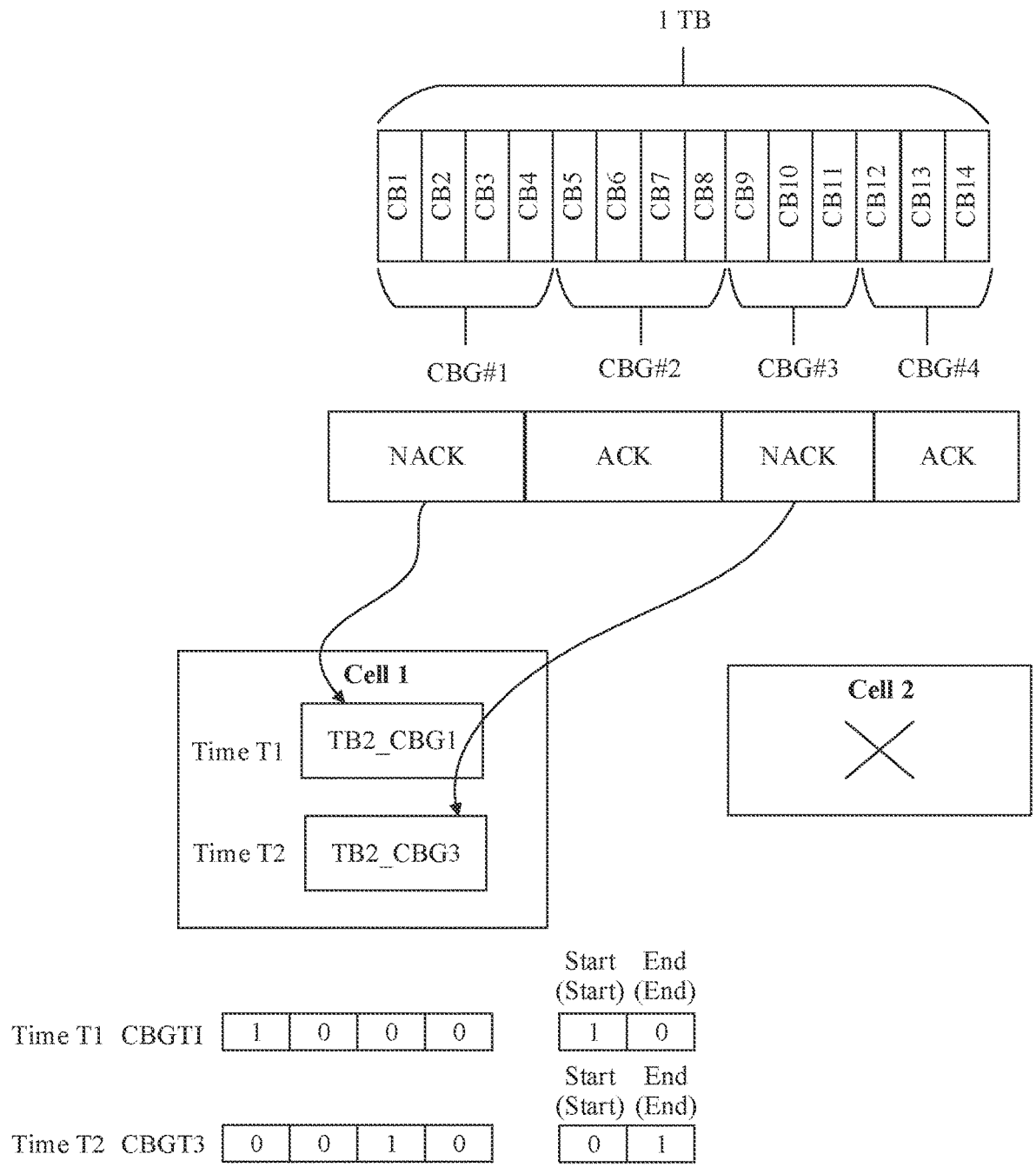
FIG. 12 and FIG. 13 are a schematic diagram of retransmission of a TB2 according to an embodiment of this application.

When the quantity of RBs required for retransmission of the TB2 is greater than the quantity of RBs available to the cell 1, the network device may divide the retransmitted TB2 into a plurality of CBGs for retransmission. As shown in FIG. 12, the to-be-retransmitted CBGs may be transmitted in a same cell. Alternatively, as shown in FIG. 13, the to-be-retransmitted CBGs may be transmitted in different cells.

For example, as shown in FIG. 12, the network device sends a TB, and the TB includes 14 CBs that are numbered from 1 to 14. When four CBGs are configured, according to an existing rule for division into CBGs, CB1 to CB4 belong to CBG #1, CB5 to CB8 belong to CBG #2, CB9 to CB11 belong to CBG #3, and CB12 to CB14 belong to CBG #4.

In this embodiment of this application, when the terminal device receives the TB, the CBG1 and the CBG3 are wrongly transmitted and cannot be corrected, the terminal device sends a NACK to the network device side; the CBG #2 and the CBG #4 are correctly transmitted, the terminal device sends an ACK to the network device side. After receiving the feedback of the terminal device, the network device may retransmit the CBG #1 and the CBG #3. The network device may send DCI to the terminal device, and the DCI is used to schedule retransmission of the CBG #1 or retransmission of the CBG #3.

Figure 13:
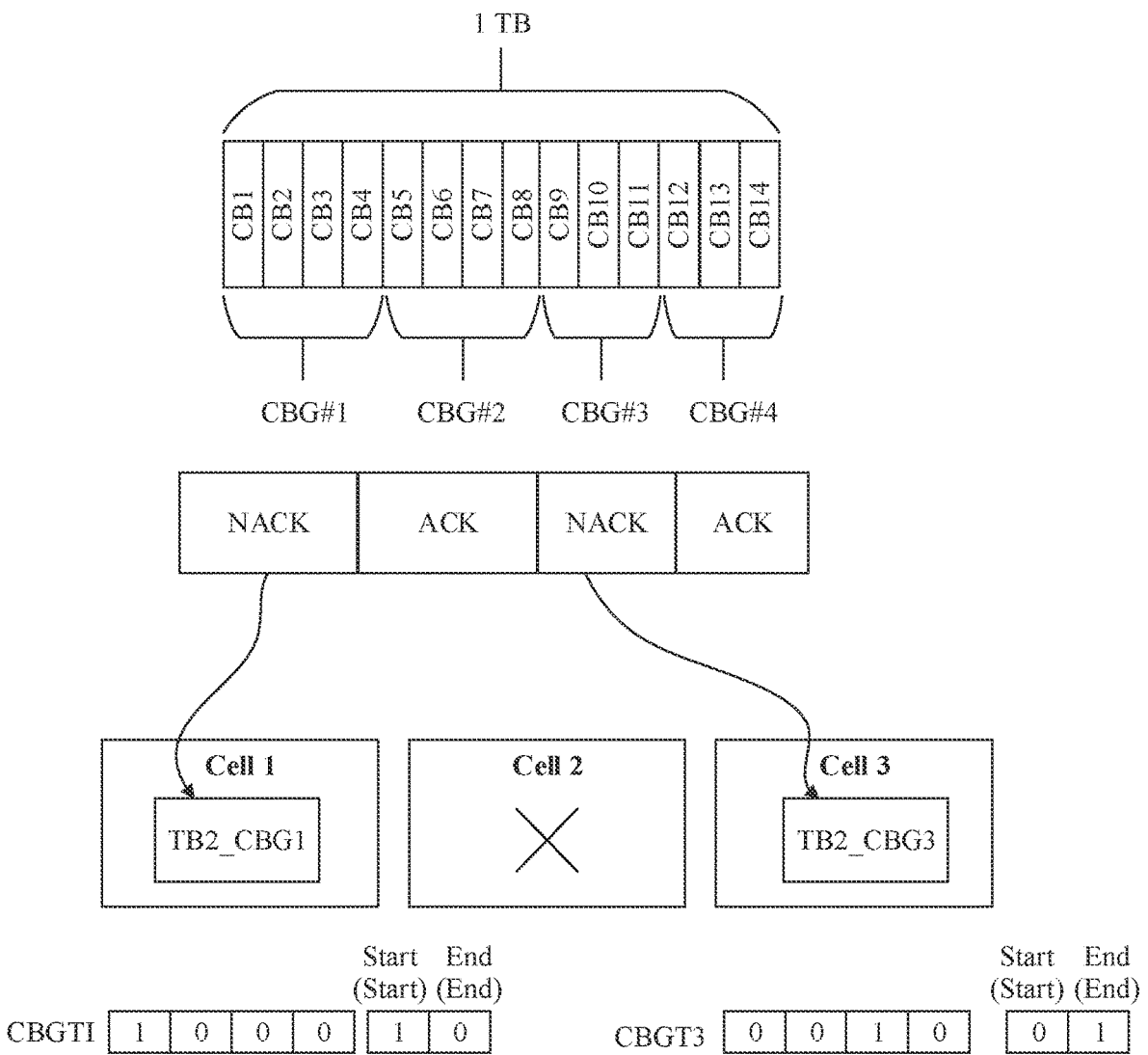

For example, as shown in FIG. 12 or FIG. 13, the DCI needs to include a CBGTI field, a start indication field, and an end indication field. As shown in FIG. 12, for retransmission of the CBG #1, a 4-bit CBGTI field may be specifically 1000, where 1 indicates that the CBG #1 is scheduled for retransmission, and 0 indicates that the CBG #2, the CBG #3, and the CBG #4 are not scheduled for retransmission. For retransmission of the CBG #3, a CBGTI field may be specifically 0010, where 1 indicates that the CBG #3 is scheduled for retransmission, and 0 indicates that the CBG #1, the CBG #2, and the CBG #4 are not scheduled for retransmission. As shown in FIG. 12, the start indication field may be represented as "start", and the end indication field may be represented as "end". For the retransmission of the CBG1, the start indication field is 1, and the end indication field is 0. For the retransmission of the CBG3, the start indication field is 0, and the end indication field is 1.

A process in which the CBG #1 and the CBG #3 are retransmitted in a same cell, namely, the cell 1, shown in FIG. 12 is similar to a process in which the CBG #1 and the CBG #3 are respectively retransmitted in different cells, namely, the cell 1 and the cell 3, shown in FIG. 13. A difference lies in that, in the example shown in FIG. 12, the CBG #1 and the CBG #3 may be separately transmitted in the cell 1 at different time points. For example, the CBG #1 may be transmitted in the cell 1 at time T1, and the CBG #3 may be transmitted in the cell 1 at time T2. In the example shown in FIG. 13, the CBG #1 and the CBG #3 may be simultaneously transmitted in the cell 1 and the cell 3. Compared with the manner shown in FIG. 12, this manner can improve transmission efficiency. In addition, it may be understood that, if it is set that the TB2 is data in the HARQ entity 2, in the first solution, in addition to establishing the correspondence between the cell 1 and the HARQ entity 2, a correspondence between the cell 3 and the HARQ entity 2 further needs to be established, and the correspondence between the cell 3 and the HARQ entity 2 needs to be notified to the terminal device through an air interface.

After the first cell recovers to normal, data that is not correctly transmitted in the second cell may be transferred to the first cell for retransmission. For example, if it is set that the second data and the third data are initially transmitted in the second cell, retransmission of the second data and the third data may be transferred to the first cell. For example, in this embodiment of this application, the network device may send fourth DCI, and the fourth DCI is used to schedule retransmission of the second data and the third data. The network device may simultaneously retransmit the second data and the third data in the first cell. Correspondingly, the terminal device may simultaneously receive the retransmitted second data and third data in the first cell.

Alternatively, data that is not correctly transmitted in the second cell may be transferred to the third cell for retransmission. For example, if it is set that the second data and the third data are initially transmitted in the second cell, retransmission of the second data and the third data may be transferred to the third cell. For example, in this embodiment of this application, the network device may send fourth DCI, and the fourth DCI is used to schedule retransmission of the second data and the third data. The network device may simultaneously retransmit the second data and the third data in the third cell. Correspondingly, the terminal device may simultaneously receive the transmitted second data and third data in the third cell.

An application scenario is provided. In the application scenario, the cell 1 may be corresponding to the second cell, the cell 2 may be corresponding to the first cell or the third cell, a TB1_0 may be corresponding to the second data, and a TB1_1 may be corresponding to the third data. In this embodiment of this application, after the cell 2 recovers from an abnormality, the TB1_0 and the TB1_1 that are initially transmitted in the cell 1 may be transferred to the cell 2 for retransmission.

Figure 14:
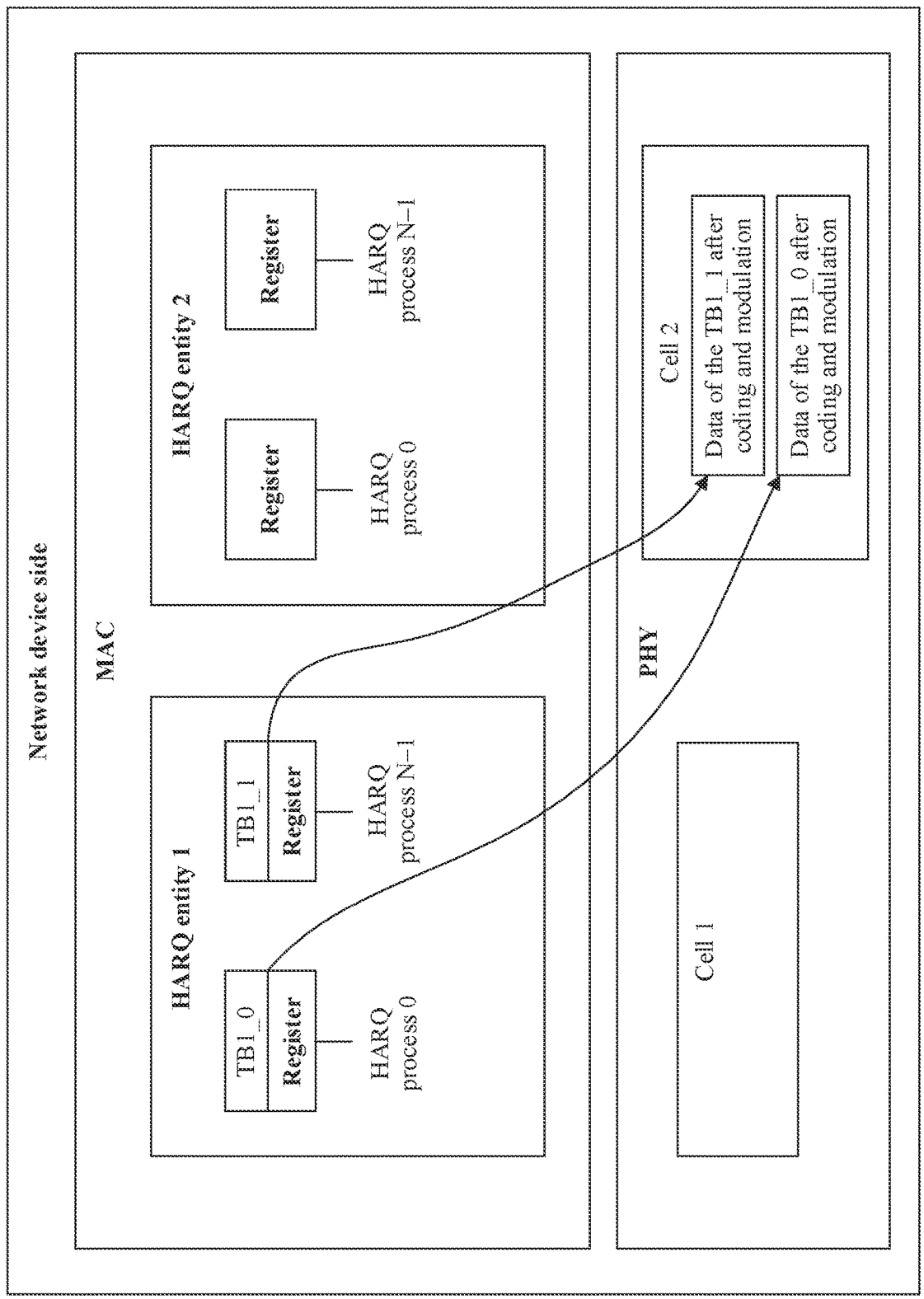
FIG. 14 is a schematic diagram of retransmission of a TB1 according to an embodiment of this application.

As shown in FIG. 14, it is set that the TB1_0 and the TB1_1 are initially transmitted in the cell 1. After the cell 2 recovers from the abnormality, the network device may send DCI to the terminal device. The DCI is used to schedule retransmission of the TB1_0 and the TB1_1. The network device retransmits the TB1_0 and the TB1_1 in the second cell.

For example, the DCI may include frequency domain dynamic resource allocation of each TB, time domain dynamic resource allocation of each TB, TB quantity indication information, a modulation and coding indication of each TB, a new data indicator of each TB, a redundancy version indication of each TB, HARQ process number indication information included in each TB, a TBS index, and the like. Specifically:

The frequency domain dynamic resource allocation of each TB indicates a frequency resource occupied for transmission of each TB. In this embodiment, each TB can occupy different frequency resources. In addition, in consideration of reducing DCI load, a plurality of TBs may be sent by using one joint frequency resource, and only one frequency domain resource allocation field is required.

The time domain dynamic resource allocation of each TB indicates a time domain resource occupied for transmission of each TB. In this embodiment, each TB can occupy different time domain resources. In addition, in consideration of reducing DCI load, a plurality of TBs may be sent by using one joint time domain resource, and only one time domain resource allocation field is required.

The TB quantity indication information may indicate a quantity of TBs transmitted in one time unit, a total quantity of TBs, or a quantity of additional TBs in one time unit. When spatial multiplexing is not considered, only one TB can be transmitted in one cell in one time unit. In this embodiment of this application, N TBs can be transmitted in one cell in one time unit, and N>1. The TB quantity indication information may be N or N−1. For example, in this embodiment of this application, when the quantity of TBs indicates the total quantity of TBs, the quantity of TBs indicated by the TB quantity indication information may be 2, which are respectively a TB1_0 and a TB1_1. When the quantity of TBs indicates the quantity of additional TBs, the quantity of TBs indicated by the TB quantity indication information may be 1, and it indicates that one additional TB is transmitted on a basis of one original TB.

The modulation and coding indication of each TB, the new data indicator of each TB, and the redundancy version indication of each TB are supported in this embodiment. When the total quantity of TBs is 2, there are MCS 1, NDI 1, and RV 1, and MCS 2, NDI 2, and RV 2.

The HARQ process number indication information included in the TB may specifically include number indication information corresponding to a HARQ process 0 corresponding to the TB1_0, number indication information corresponding to a HARQ process N−1, and the like.

The TBS index may indicate a TBS size, for example, a size of the TB1_0 or a size of the TB1_1. For example, in this embodiment of this application, as shown in Table 4, that the TBS index of the TB1_0 indicated by the DCI is 1, and it indicates that the TBS size of the TB1_0 is 24 bits. The terminal device may determine a total TBS size of the plurality of TBs based on the information indication in the DCI and the system parameter by using a TBS determining method in a current technology. The terminal device may obtain a TBS size of a TB by subtracting a TBS size of another TB from the total TBS size. For example, when the terminal device determines, by using the current technology, that the total TBS size is 80 bits, the terminal device may obtain, through calculation that 80−24=56, that a size of the TB1_1 is 56 bits. When the total quantity of TBs is N and N>1, N−1 TBS indexes need to be indicated.

In an example of this application, as shown in Table 4, a downlink scheduling DCI format 1_1 is used as an example, and the DCI indication may include the following content:

TABLE 4

| Field item (field item) | Bits (bits) | Reference (reference) |
|---|---|---|
| Frequency domain resource assignment (frequency domain resource assignment) | Variable (variable) | Joint frequency resource indication of a plurality of TBs |
| Time domain resource assignment (time domain resource assignment) | 1, 2, 3, and 4 | Joint time domain resource indication of a plurality of TBs |
| TB number (TB number) | 0, 1, and 2 | Additional TB quantity indication, where a maximum of four additional TBs is supported |

For example, the terminal device may determine a total TBS size in the following manner:

(1) The terminal device may obtain a parameter, namely, $n_{PRB}$, and a parameter, namely, $N_{symb}^{sh}$, based on the frequency resource assignment and time domain resource assignment information sent by the network device. Based on the parameter $n_{PRB}$ and the parameter $N_{symb}^{sh}$, a quantity of REs in one scheduling time unit is determined. For example, the quantity of REs in one scheduling time unit may satisfy the following formula:

$$N_{RE} = \min(156, N'_{RE}) \cdot n_{PRB},$$

$$N'_{RE} = N_{sc}^{RB} \cdot N_{symb}^{sh} - N_{DMRS}^{PRB} - N_{oh}^{PRB}$$

$N_{RE}$ represents the quantity of REs in one scheduling time unit, $N_{DMRS}^{PRB}$ represents a quantity of REs of a DM-RS of each PRBR in the scheduling time unit, $N_{DMRS}^{PRB}$ includes overheads of DM-RS CDM groups without data, and $N_{oh}^{PRB}$ is an overhead parameter configured for RRC, that is, $N_{sc}^{RB}=12$.

(2) A quantity of information bits of an intermediate variable is calculated according to the following formula.

$$N_{info} = N_{RE} \cdot R \cdot Q_m \cdot v$$

$N_{RE}$ represents the quantity of REs in one scheduling time unit, R represents a bit rate indicated by the MCS index, and Qm is a modulation order indicated by the MCS index.

(3) Based on a quantity $N_{info}$ of information bits of an intermediate quantity, a TBS value close to and not less than the quantity of information bits of the intermediate variable is found in the table shown in the following Table 5, to determine the total TBS. For example, when the quantity of information bits of the intermediate variable is 100, the TBS is 104. In addition, the total TBS may be further obtained through calculation by using the quantity of information bits of the intermediate variable and according to a specific calculation rule. For example, a quantized information bit $N'_{info}$ of the intermediate quantity is first obtained by using $$N'_{info} = \max\left(3840, 2^n \times \text{round}\left(\frac{N_{info} - 24}{2^n}\right)\right),$$

where $n = \lfloor \log_2(N_{info} - 24) \rfloor - 5$.

When a coding rate is less than ¼, $$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil;$$

when a coding rate is greater than or equal to ¼, if $N'_{info} > 8424$, $$TBS = 8 \cdot C \cdot \left\lceil \frac{N'_{info} + 24}{8 \cdot C} \right\rceil - 24,$$

otherwise $$TBS = 8 \cdot \left\lceil \frac{N'_{info} + 24}{8} \right\rceil - 24,$$

where $$C = \left\lceil \frac{N'_{info} + 24}{8424} \right\rceil.$$

TABLE 5

TBS for $N_{info} \leq 3824$

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |

TABLE 5-continued

TBS for $N_{info} \leq 3824$

| Index | TBS |
| --- | --- |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Manner 1: The terminal device notifies a beam mismatch or a link interruption to the network device through an air interface, and the network device enables ARQ retransmission. For a specific manner in which the terminal device notifies through the air interface, refer to the descriptions in the second embodiment. For details about the ARQ retransmission, refer to the sixth part of the foregoing term explanations. For details about beam failure detection and beam failure recovery, refer to the 18th part of the foregoing term explanations.

Figure 15:
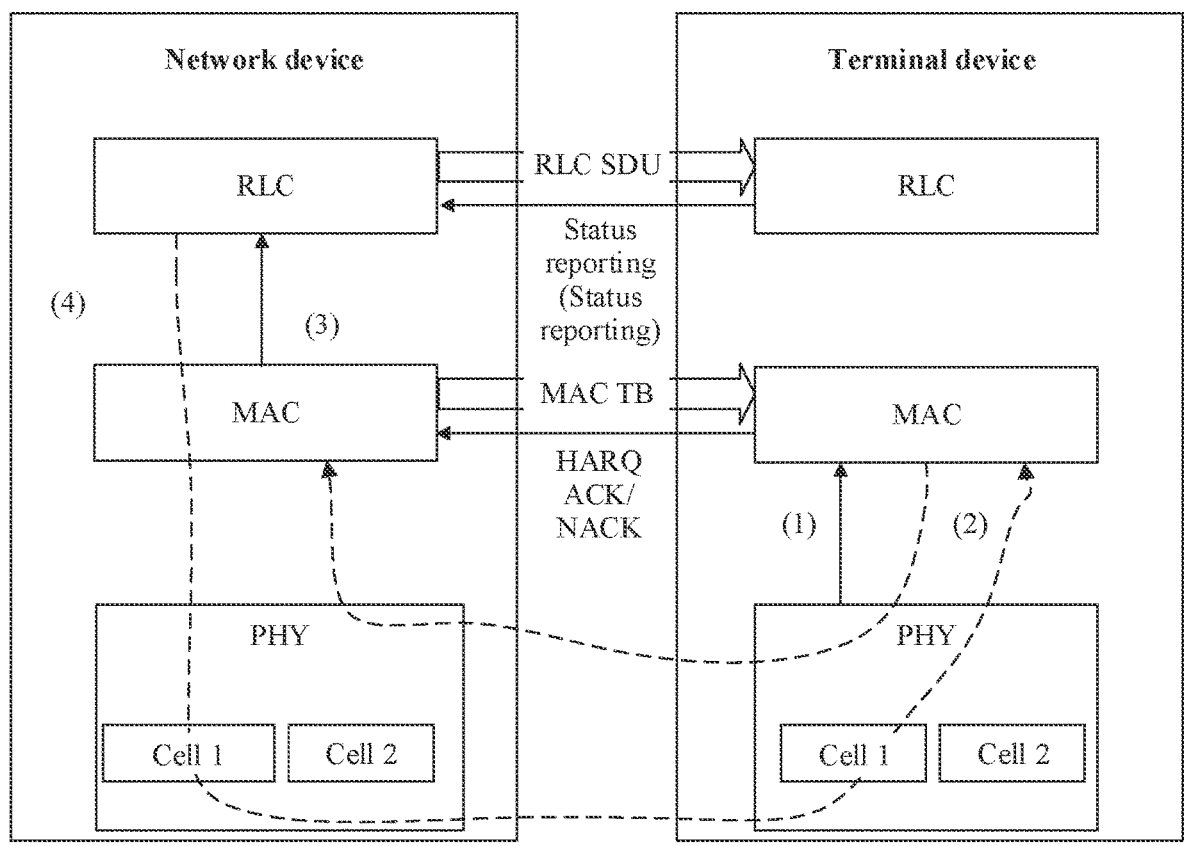
FIG. 15 and FIG. 16 are a schematic diagram of retransmission of an ARQ according to an embodiment of this application.

As shown in FIG. 15, an example in which the terminal device performs detection on the cell 2 is used for description. (1) A physical PHY layer of the terminal device reports a beam failure indication (beam failure indication) to a MAC layer of the terminal device. (2) The MAC layer of the terminal device performs beam detection after receiving the reported beam failure indication. In addition, if a beam failure is detected, a MAC layer of the network device is notified through an air interface. (3) The MAC layer of the network device notifies an RLC layer. (4) The RLC layer of the network device enables ARQ retransmission, and a PCell or a PSCell may send a retransmitted RLC SDU or RLC SDU segment to the terminal device side in the cell 1.

Manner 2: The terminal device notifies a beam failure or a link failure to the network device by using a status reporting of the RLC layer, and the network device enables ARQ retransmission.

Figure 16:
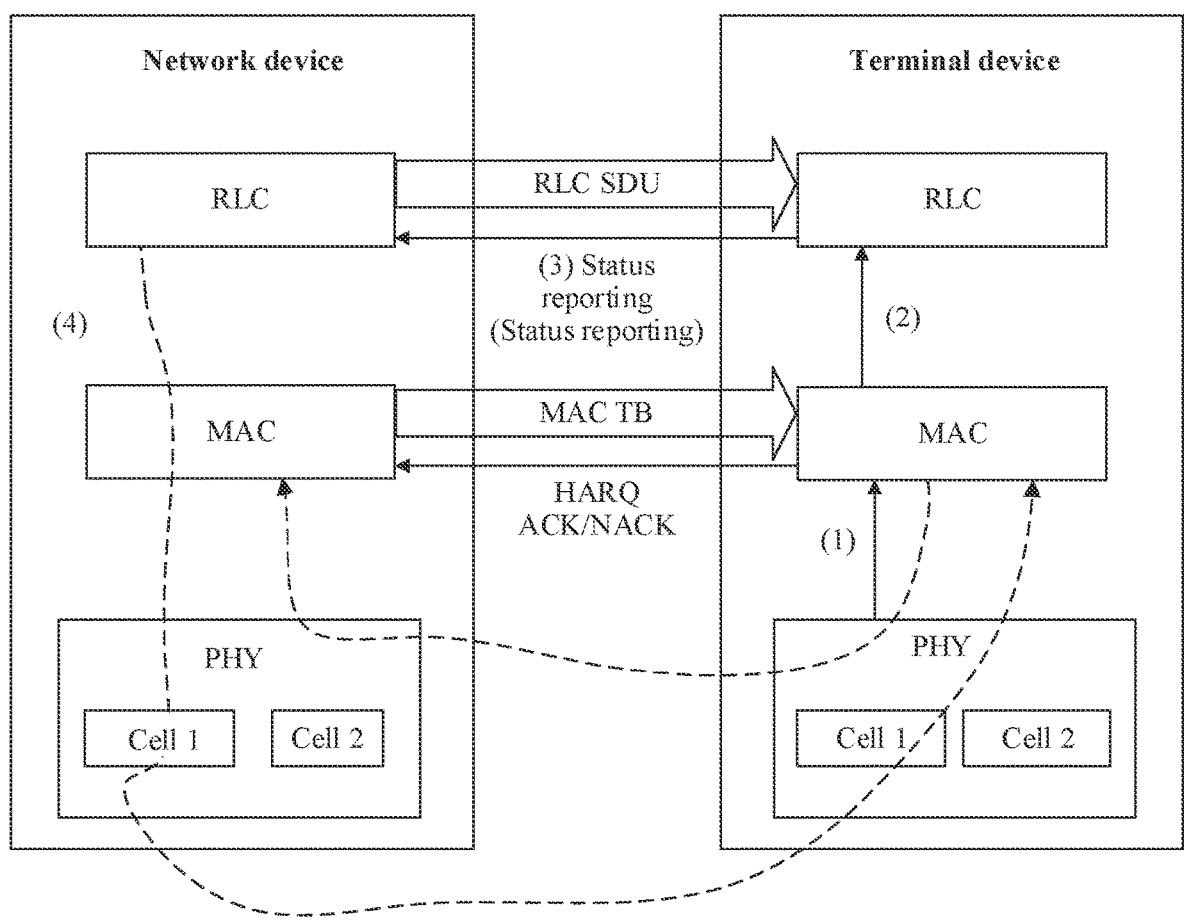

As shown in FIG. 16, an example in which the terminal device performs detection on the cell 2 is used for description. (1) A physical PHY layer of the terminal device reports a beam failure indication (beam failure indication) to a MAC layer of the terminal device. (2) The MAC layer of the terminal device performs beam detection after receiving the reported beam failure indication. The MAC layer of the terminal side transfers the beam failure information to the RLC layer. (3) After receiving the beam failure information, the RLC layer of the terminal device sends an RLC status reporting (status reporting) to the network device. The RLC status reporting includes information about an RLC SDU or an RLC SDU segment that is not correctly received by the terminal side. (4) The RLC layer of the network device enables ARQ retransmission after receiving the RLC status reporting sent by the terminal, and a PCell or a PSCell may send the RLC SDU or RLC SDU segment that is not correctly received to the terminal device side in the cell 1.

In this embodiment of this application, a HARQ transmission framework does not need to be changed, and initially transmitted data and retransmitted data are not required to have a same TBS. Therefore, the implementation is simpler.

Figure 18:
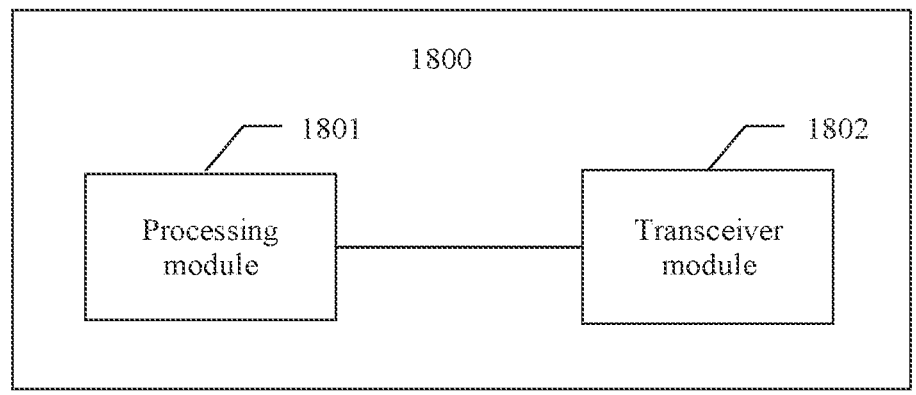
FIG. 18 is a schematic diagram of a structure of a communication apparatus according to an embodiment of this application.

Same as the foregoing concept, as shown in FIG. 18, an embodiment of this application further provides an apparatus 1800, including a processing module 1801 and a transceiver module 1802.

In an example, the apparatus 1800 may be configured to implement functions of the terminal device in the foregoing methods. The apparatus may be a terminal device, or may be an apparatus in the terminal device. The apparatus may be a chip system, and the chip system may include a chip, or may include a chip and another discrete component.

The processing module 1801 is configured to receive initially transmitted first data in a first cell based on a correspondence between the first cell and a first hybrid automatic repeat request (HARQ) entity. The transceiver module 1802 is configured to receive first indication information, where the first indication information is used to indicate a correspondence between a second cell and the first HARQ entity. The processing module 1801 is further configured to receive retransmitted first data in the second cell based on the correspondence between the second cell and the first HARQ entity. For descriptions of the processing module 1801 and the transceiver module 1802, refer to descriptions related to the terminal device side in the method embodiments. Details are not described herein again.

In another example, the apparatus 1800 may be configured to implement functions of the network device in the foregoing methods. The apparatus may be a network device, or may be an apparatus in the network device. The apparatus may be a chip system, and the chip system may include a chip, or may include a chip and another discrete component.

The processing module 1801 is configured to initially transmit first data in a first cell based on a correspondence between the first cell and a first hybrid automatic repeat request (HARQ) entity. The transceiver module 1802 is configured to send first indication information, where the first indication information is used to indicate a correspondence between a second cell and the first HARQ entity. The processing module 1801 is further configured to retransmit the first data in the second cell based on the correspondence between the second cell and the first HARQ entity. For descriptions of the processing module 1801 and the transceiver module 1802, refer to descriptions related to the network device side in the method embodiments. Details are not described herein again.

It may be understood that, for specific implementations of the transceiver module 1802 and the processing module 1801, refer to descriptions in the method embodiments. Division into modules in this embodiment of this application is an example, is merely logical function division, and may be other division in actual implementation. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 19:
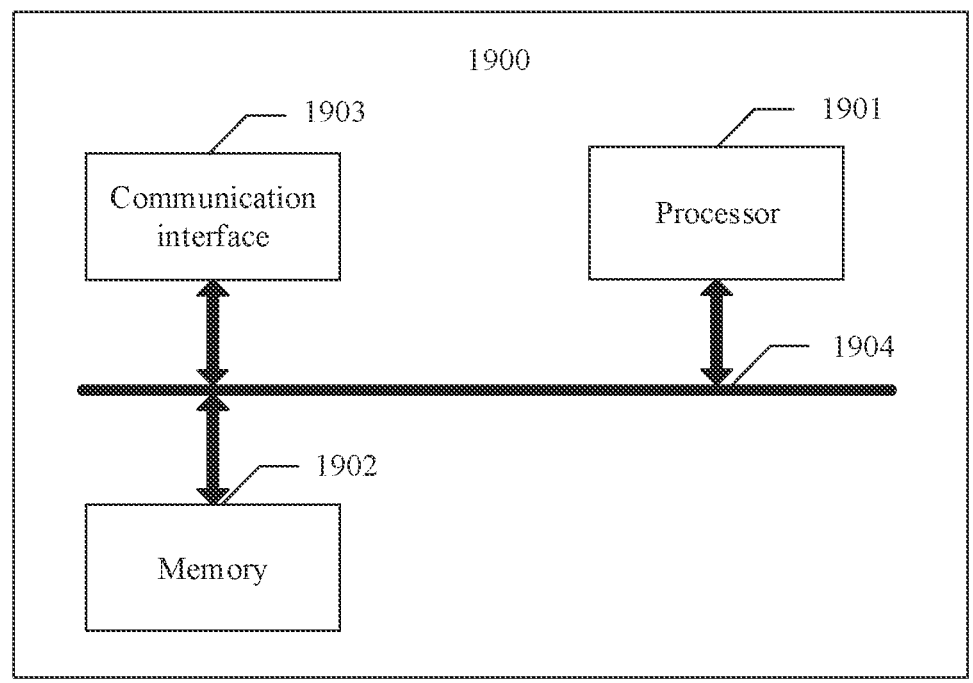
FIG. 19 is a schematic diagram of a structure of a communication apparatus according to an embodiment of this application.

Same as the foregoing concept, as shown in FIG. 19, an embodiment of this application further provides an apparatus 1900.

In an example, the apparatus 1900 is configured to implement functions of the terminal device in the foregoing methods. The apparatus may be a terminal device, or may be an apparatus in the terminal device. The apparatus 1900 includes at least one processor 1901, configured to implement the functions of the terminal device in the foregoing methods. For example, the processor 1901 may receive initially transmitted first data in a first cell based on a correspondence between the first cell and a first HARQ entity. For how to receive the initially transmitted first data in the first cell based on the correspondence between the first cell and the first HARQ entity, refer to the descriptions in the method embodiments. Details are not described herein again. The apparatus 1900 may further include at least one memory 1902, configured to store program instructions and/or data. The memory 1902 is coupled to the processor 1901. Coupling in the embodiments of this application may be indirect coupling or a communication connection between apparatuses, units, or modules in an electrical form, a mechanical form, or another form, and is used for information exchange between the apparatuses, the units, or the modules. The processor 1901 and the memory 1902 operate in collaboration. The processor 1901 may execute the program instructions stored in the memory 1902. At least one of the at least one memory may be included in the processor 1901. The apparatus 1900 may further include a communication interface 1903, configured to communicate with another device through a communication transmission medium, so that the apparatus in the apparatus 1900 can communicate with the another device. For example, the communication interface 1903 may be a transceiver, a circuit, a bus, a module, or another type of communication interface, and the another device may be a network device. The processor 1901 receives and sends data through the communication interface 1903, and is configured to implement the methods in the foregoing embodiments. For example, the communication interface 1903 may receive the first indication information.

In an example, the apparatus 1900 is configured to implement functions of the network device in the foregoing methods. The apparatus may be a network device, or may be an apparatus in the network device. The apparatus 1900 includes at least one processor 1901, configured to implement the functions of the network device in the foregoing methods. For example, the processor 1901 may initially transmit first data in a first cell based on a correspondence between the first cell and a first HARQ entity. For how to initially transmit the first data in the first cell based on the correspondence between the first cell and the first HARQ entity, refer to the descriptions in the method embodiments. Details are not described herein again. The apparatus 1900 may further include at least one memory 1902, configured to store program instructions and/or data. The memory 1902 is coupled to the processor 1901. Coupling in the embodiments of this application may be indirect coupling or a communication connection between apparatuses, units, or modules in an electrical form, a mechanical form, or another form, and is used for information exchange between the apparatuses, the units, or the modules. The processor 1901 and the memory 1902 operate in collaboration. The processor 1901 may execute the program instructions stored in the memory 1902. At least one of the at least one memory may be included in the processor 1901. The apparatus 1900 may further include a communication interface 1903, configured to communicate with another device through a communication transmission medium, so that the apparatus in the apparatus 1900 can communicate with the another device. For example, the communication interface 1903 may be a transceiver, a circuit, a bus, a module, or another type of communication interface, and the another device may be a terminal device. The processor 1901 receives and sends data through the communication interface 1903, and is configured to implement the methods in the foregoing embodiments. For example, the communication interface 1903 may send the first indication information.

A connection medium between the communication interface 1903, the processor 1901, and the memory 1902 is not limited in this embodiment of this application. In the embodiments of this application, in FIG. 19, the memory 1902, the processor 1901, and the communication interface 1903 are connected by using a bus 1904. The bus is represented by a thick line in FIG. 19. A connection manner between other components is merely an example for description, and is not limited thereto. The bus may be classified into an address bus, a data bus, a control bus, and the like. For ease of representation, only one thick line is used to represent the bus in FIG. 19, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

In this embodiment of this application, the memory may be a non-volatile memory, such as a hard disk drive (HDD) or a solid-state drive (SSD), or may be a volatile memory, such as a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

All or some of the methods in the embodiments of this application may be implemented through software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of procedures or functions according to the embodiments of the present invention are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the scope of this application. In this way, this application is intended to cover these modifications and variations of this application provided that they fall within the scope of the claims of this application and equivalent technologies thereof.

In the embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects.

It should be noted that, in the embodiments of this application, different embodiments may be used independently or in combination with each other. This is not limited in the embodiments of this application. In addition, on a premise that there is no logical contradiction, the embodiments may be mutually referenced. For example, methods and/or terms in the method embodiments may be mutually referenced, functions and/or terms in the apparatus embodiments may be mutually referenced, and functions and/or terms in the apparatus embodiments and the method embodiments may be mutually referenced.

What is claimed is:

1. A communication method, comprising:
   receiving initially transmitted first data in a first cell based on a correspondence between the first cell and a first hybrid automatic repeat request (HARQ) entity;
   receiving first indication information, wherein the first indication information is an identifier of a first bandwidth part (BWP) of a second cell, wherein the identifier of the first BWP indicates a correspondence between the second cell and the first HARQ entity; and
   receiving retransmitted first data in the second cell based on the correspondence between the second cell and the first HARQ entity.

2. The method according to claim 1, wherein the correspondence between the second cell and the first HARQ entity comprises a correspondence between the first BWP and the first HARQ entity.

3. The method according to claim 2, wherein the method further comprises:
   determining the correspondence between the first BWP and the first HARQ entity based on the identifier of the first BWP.

4. The method according to claim 1, wherein the method further comprises:
   sending second indication information, wherein the second indication information indicates a link interruption of the first cell or a beam mismatch of the first cell.

5. The method according to claim 1, wherein the first data comprises a first data block, and the method further comprises:
   receiving first downlink control information (DCI), wherein the first DCI schedules retransmission of the first data block; and wherein
   the receiving retransmitted first data in the second cell based on the correspondence between the second cell and the first HARQ entity comprises:
   receiving the retransmitted first data block in the second cell based on the correspondence between the second cell and the first HARQ entity.

6. The method according to claim 5, wherein the first data comprises a second data block, and the method further comprises:
   receiving second DCI, wherein the second DCI schedules retransmission of the second data block; and wherein
   the receiving retransmitted first data based on the correspondence between the second cell and the first HARQ entity comprises:
   receiving the retransmitted second data block in the second cell based on the correspondence between the second cell and the first HARQ entity.

7. The method according to claim 5, wherein the method further comprises:
   receiving the retransmitted first data in a third cell based on a correspondence between the third cell and the first HARQ entity.

8. The method according to claim 7, wherein the first data comprises a second data block, and the method further comprises:
   receiving third DCI, wherein the third DCI schedules retransmission of the second data block; and wherein
   the receiving the retransmitted first data in a third cell based on a correspondence between the third cell and the first HARQ entity comprises:
   receiving the retransmitted second data block in the third cell based on the correspondence between the third cell and the first HARQ entity.

9. The method according to claim 6, wherein the first DCI further indicates at least one of an index of the first data block, a start identifier, or an end identifier, and the second DCI further indicates at least one of an index of the second data block, a start identifier, or an end identifier, wherein
   the start identifier indicates a first retransmitted data block in the retransmitted first data, and the end identifier indicates a last retransmitted data block in the retransmitted first data.

10. The method according to claim 1, wherein the method further comprises:
    sending fourth DCI, wherein the fourth DCI schedules retransmission of second data and third data, and the second data and the third data are initially transmitted in the second cell; and
    retransmitting the second data and the third data in the first cell, or retransmitting the second data and the third data in a fourth cell.

11. A communication method, comprising:
    initially transmitting first data in a first cell based on a correspondence between the first cell and a first hybrid automatic repeat request (HARQ) entity;
    sending first indication information, wherein the first indication information is an identifier of a first bandwidth part (BWP) of a second cell, wherein the identifier of the first BWP indicates a correspondence between the second cell and the first HARQ entity; and
    retransmitting the first data in the second cell based on the correspondence between the second cell and the first HARQ entity.

12. The method according to claim 11, wherein the correspondence between the second cell and the first HARQ entity comprises a correspondence between the first BWP and the first HARQ entity.

13. The method according to claim 11, wherein the method further comprises:
receiving second indication information, wherein the second indication information indicates a link interruption of the first cell or a beam mismatch of the first cell.

14. The method according to claim 11, wherein the first data comprises a first data block, and the method further comprises:
sending first downlink control information (DCI), wherein the first DCI schedules retransmission of the first data block; and wherein
the retransmitting the first data in the second cell based on the correspondence between the second cell and the first HARQ entity comprises:
retransmitting the first data block in the second cell based on the correspondence between the second cell and the first HARQ entity.

15. The method according to claim 14, wherein the first data comprises a second data block, and the method further comprises:
sending second DCI, wherein the second DCI schedules retransmission of the second data block; and wherein
the retransmitting the first data in the second cell based on the correspondence between the second cell and the first HARQ entity comprises:
retransmitting the second data block in the second cell based on the correspondence between the second cell and the first HARQ entity.

16. The method according to claim 14, wherein the method further comprises:
retransmitting the first data in a third cell based on a correspondence between the third cell and the first HARQ entity.

17. The method according to claim 16, wherein the first data comprises a second data block, and the method further comprises:
sending third DCI, wherein the third DCI schedules retransmission of the second data block; and wherein the retransmitting the first data in a third cell based on a correspondence between the third cell and the first HARQ entity comprises:
retransmitting the second data block in the third cell based on the correspondence between the third cell and the first HARQ entity.

18. The method according to claim 15, wherein the first DCI further indicates at least one of an index of the first data block, a start identifier, or an end identifier, and the second DCI further indicates at least one of an index of the second data block, a start identifier, or an end identifier, wherein
the start identifier indicates a first retransmitted data block in the retransmitted first data, and the end identifier indicates a last retransmitted data block in the retransmitted first data.

19. A communication apparatus, comprising:
at least one processor; and
one or more memories coupled to the at least one processor and storing programming instructions for execution by the at least one processor to cause the apparatus to:
receive initially transmitted first data in a first cell based on a correspondence between the first cell and a first hybrid automatic repeat request (HARQ) entity;
receive first indication information, wherein the first indication information is an identifier of a first bandwidth part (BWP) of a second cell, wherein the identifier of the first BWP indicates a correspondence between the second cell and the first HARQ entity; and
receive retransmitted first data in the second cell based on the correspondence between the second cell and the first HARQ entity.

20. The communication apparatus according to claim 19, wherein the instructions, when executed, cause the apparatus to:
send second indication information, wherein the second indication information indicates a link interruption of the first cell or a beam mismatch of the first cell.

* * * * *